United States Patent [19]
Link

[11] Patent Number: 6,000,305
[45] Date of Patent: Dec. 14, 1999

[54] MULTIPLE-SPINDLE TURNING MACHINE

[75] Inventor: Helmut Friedrich Link, Aichwald, Germany

[73] Assignee: Index-Werke GmbH & Co. KG Hahn & Tessky, Esslingen, Germany

[21] Appl. No.: 08/855,356

[22] Filed: May 13, 1997

[30] Foreign Application Priority Data

May 15, 1996 [DE] Germany .......................... 196 19 720

[51] Int. Cl.⁶ ....................................................... B23B 3/30
[52] U.S. Cl. ................................. 82/129; 82/1.11; 82/124
[58] Field of Search .............................. 82/129, 138, 146, 82/151, 155, 162, 164, 1.11

[56] References Cited

U.S. PATENT DOCUMENTS

| | | | |
|---|---|---|---|
| 2,140,019 | 12/1938 | Lewis | 82/129 |
| 3,744,355 | 7/1973 | Flisch | 82/25 |
| 4,061,060 | 12/1977 | Trautmann | 82/3 |
| 5,083,485 | 1/1992 | Link et al. | 82/124 |
| 5,768,962 | 6/1998 | Link et al. | 82/129 |

FOREIGN PATENT DOCUMENTS 2 303 626  10/1976  France .
16 02 949  9/1970  Germany .

Primary Examiner—Daniel W. Howell
Assistant Examiner—Mark Williams
Attorney, Agent, or Firm—Barry R. Lipsitz; Ralph F. Hoppin

[57] ABSTRACT

In order to improve a multiple-spindle turning machine comprising a machine frame, a spindle drum arranged to rotate relative to the machine frame around a drum axis having a number of work piece spindles movable in the direction of rotation, said work piece spindles being respectively provided with a work piece receiving means for a work piece, and a number of stations, comprising at least one machining station, arranged consecutively on the machine frame in the direction of rotation of the work pieces corresponding to the number of work piece spindles, in such a way that the number of tools which may be used can be increased at low expense, it is proposed that for machining the work pieces, the at least one machining station has a first and a second spindle position, which are arranged at an angular distance from one another relative to the drum axis; that the spindle drum is rotatable in such a manner that a work piece spindle with a work piece may be positioned in each of the spindle positions; and that each spindle position is provided with its own machining tool.

56 Claims, 17 Drawing Sheets

| VERSION | LOADING AND UNLOADING | | WORK PIECE CYCLE AND STEP SEQUENCE | DRUM SWITCHES PER PART (= MACHINING RATE SECTION) | SIDE A STATIONS/ TOOLS (52 or 54) | SIDE B STATIONS/ TOOLS | JOINTLY USED STATIONS/ TOOLS |
|---|---|---|---|---|---|---|---|
| | Station 8 | Station 7 and 8 | | | | | |
| 1. | X | X | 8 x S$_3$ = 8 x 45° | 1 | 7/14 6/12 | ------ ------ | ------ ------ |
| 2. | X | X | 8 x S$_1$ + S$_2$ = 8 x (15° + 30°) | 2 | 14/28 12/24 | ------ ------ | ------ ------ |
| 3. | X | X | 8 x S$_3$ = 8 x 45° | 2 | 7/14 6/12 | 7/14 6/12 | 7/14 6/12 |
| 4. | X | X | 8 x (S$_1$ + S$_2$) = 8 x (15° + 30°) | 4 | 14/28 12/24 | 14/28 12/24 | 14/28 12/24 |
| 5. | X | X | 4x(S$_1$+S$_2$+S$_3$) =4x(15°+30°+45°) | 3 | 10/20 9/18 | 11/22 9/18 | 7/14 6/12 |
| 6. | X | | 4 x (S$_4$ + S$_5$) =4 x (60°+30°) | 2 | 7/14 6/12 | 7/14 6/12 | ------ ------ |
| 7. | | | 4x(S$_2$ + S$_5$) = 4x(15°+75°) | 2 | 6/12 | 6/12 | ------ |
| 8.¹⁾ | | X | 4 x S$_5$ = 4 x 90° | 1 | 3/6 | 3/6 | ------ |

¹) If only one side A is finished with a very low number of tools, then side B may be used as side A.

In the drum switch sequence 8 x 45° and 4 x 90° 2 sets of tools can be provided (1. and 2.) After abrasion of the first set a zero point rotation of the drum around 15° occurs.

Only side A : 8 parts per drum rotation ready machined
Side A and B : 4 parts per drum rotation ready machined

Fig. 17

MULTIPLE-SPINDLE TURNING MACHINE

The present disclosure relates to the subject matter disclosed in German Application No. 196 19 720.1 of May 15, 1996, the entire specification of which is incorporated herein by reference.

BACKGROUND OF THE INVENTION

The invention relates to a multiple-spindle turning machine or lathe comprising a machine frame, a spindle drum arranged to rotate relative to the machine frame around a drum axis having a number of work piece spindles, which are arranged at defined angular distances relative to the drum axis and, during a rotation of the spindle drum, movable in a direction of rotation relative to the machine frame, said work piece spindles being respectively provided with a work piece receiving means for a work piece, and a number of stations, comprising at least one machining station, arranged consecutively on the machine frame in the direction of rotation of the work pieces corresponding to the number of work piece spindles.

Such multiple-spindle turning machines are known from the prior art. In the case of these multiple-spindle turning machines, a single spindle position is provided in each station, in which machining or handling of the work piece occurs. The disadvantage of such multiple-spindle turning machines is that the number of tools which may be used in a machining station is either restricted or requires a high expenditure in mechanical or control means.

SUMMARY OF THE INVENTION

The object of the invention is to improve a multiple-spindle turning machine of the defined type in such a manner that the number of tools which may be used may be increased at low expense.

This object is achieved according to the invention with a multiple-spindle turning machine of the type described above in that for machining the work pieces, at least one machining station has a first and a second spindle position, which are arranged at an angular distance from one another relative to the drum axis; that the spindle drum is rotatable in such a manner that a work piece spindle with a work piece may be positioned in each of the spindle positions; and that each spindle position is provided with its own machining tool.

The advantage of the solution according to the invention is that the provision of two spindle positions arranged at an angular position from one another in the direction of rotation creates the simple possibility of using at least two tools in the machining stations, namely at least one in each respective spindle position.

This solution provides the possibility of using double the number of tools in the respective machining station without having to employ a high mechanical expenditure in placing the tools in readiness.

The advantages of the solution according to the invention may be even better utilized if at least two of the stations are constructed as machining stations respectively with a first and a second spindle position.

However, the concept according to the invention is not restricted to only two spindle positions in the at least one machining station, but also covers the provision of more than two spindle positions in the machining station.

Of particular advantage is a solution in which the stations present on the multiple-spindle turning machine are either constructed as loading and/or unloading stations, possibly also with additional machining means, or as machining stations, so that optimum use is made of the possibilities provided by the number of stations.

In principle, it is possible within the scope of the solution according to the invention to only equip the at least one machining station with the first and the second spindle position and equip the other spindle stations with at least one spindle position. It is advantageous in these cases, in particular to permit lowest possible machining rates and the most efficient operation of the multiple-spindle turning machine according to the invention as possible, if the other stations have at least one spindle position, which have an angular distance from the first or the second spindle position of the at least one machining station which corresponds to an integral multiple of 360° divided by the number of work piece spindles. In this case, there is the possibility that with a work piece spindle standing in a spindle position of the at least one machining station, at least one or more of the other work piece spindles also stands in one of the spindle positions of the other stations, in which, for example, either handling or machining is possible.

However, it is particularly advantageous with respect to the machining rates which may be achieved if all the stations respectively have the same number of spindle positions, so that the number of possibilities in machining or handling of the work pieces is also improved in the other stations. In this case, a particularly advantageous solution provides that the first spindle positions, arranged consecutively in the direction of rotation, of all stations have an angular distance of 360° divided by the number of work piece spindles. The possibility is thereby provided to simultaneously position a work piece in several of the first spindle positions. It is possible, in particular, in the case of work piece spindles arranged at equal angular distances on the spindle drums, to position a work piece respectively in each first spindle position of all the stations and in turn to achieve this when a rotation of the spindle drum around an angle of 360° divided by the number of work piece spindles occurs.

Alternatively or additionally hereto, it is also possible that the second spindle positions, arranged consecutively in the direction of rotation, of all stations have an angular distance of 360° divided by the number of work piece spindles. As a result of this, the aforementioned advantages may also be achieved, in particular in the case of work pieces arranged at equal angular distance from one another on the spindle drum.

Of particular advantage is an embodiment in which both the first spindle positions of all stations and the second spindle positions of all stations, and possibly also further spindle positions of all stations, are respectively arranged at an angular distance of 360° divided by the number of work piece spindles. In this case, the angular distance between the first spindle position and the further spindle positions is also always constant. In this way it is assured, in particular in the case of work piece spindles arranged at equal angular distance from one another, that when one of the work piece spindles stands in one of the spindle positions of one of the stations, then the other work piece spindles necessarily stand in one of the spindle positions of the other stations.

No further details have thus far been given with respect to the arrangement of the tools allocated to the first and the second spindle positions of the at least one machining station. In principle, the tools may be arranged so that they may be used and moved completely independently of one another. A particularly advantageous embodiment provides that the tools allocated to the first and the second spindle position of the at least one machining station may be moved on parallel tool paths. This solution has the substantial advantage that the positioning devices for movement of the two tools on their respective tool paths may be arranged so as to save space and to be movable with-out colliding.

The course of the tool paths running parallel to one another relative to the drum axis can be as desired in principle. It is particularly advantageous, likewise with respect to a space-saving construction, if the tool paths run parallel to a direction radial to the drum axis located between the first and the second spindle position.

In an extreme case, the tool paths may lie so that one of the tool paths passes through a spindle axis of the first spindle position or the second spindle position. However, it is particularly advantageous if the two parallel tool paths run symmetrically to a direction radial to the drum axis located centrally between the first and the second spindle position.

In order to ensure that a normal turning operation is possible when machining in the first and the second spindle position of the at least one machining station, it is advantageously provided that the tool allocated to each spindle position may be moved in relation to the tool spindle standing in this spindle position in an X-direction relative to this tool spindle, whereby the X-direction always intersects the spindle axis of the tool spindle standing in the respective spindle position.

So as not to obtain any angle errors when machining in the first and the second spindle position of the at least one machining station, it is advantageously provided that, in relation to a reference position of the work piece fixed with respect to the work piece spindle, the X-direction is arranged in the second spindle axis displaced by an angle relative to the first spindle position, and that a control means calculating the coordinates of a machining of the work piece takes into account the displacement. As a result, it is assured, in particular where the work piece is machined with driven tools, that machining in X-direction in the first spindle position is identical to machining in the X-direction in the second spindle position of the at least one machining station.

As already mentioned above, in particular in conjunction with the parallel tool paths, the tools may, in principle, be moved, and therefore positioned, completely independently of one another.

However, a particularly advantageous embodiment of the solution according to the invention, especially with respect to the simplicity of the construction and actuation of the tools, provides that the tools allocated to the first and the second spindle position of the machining station may be positioned by a joint positioning device. As a result, only one positioning device is to be provided for positioning the tools both in the first and in the second spindle position, and also only one positioning device is to be actuated by the corresponding control means in the desired directions.

It is particularly advantageous in this case to determine on the control side—for example, via the rotational position of the spindle drum—whether the tool allocated to the first spindle position or the tool allocated to the second spindle position is used to correct different blade positions of the tools and possibly also correct the different orientation of the X-direction.

The construction of the above-described positioning device could, in principle, always be such that it either acts on one tool or on the other. However, a particularly simple solution is one in which the tools allocated to the first and the second spindle position of the machining station may be moved simultaneously by means of the positioning device. This means that no selection is made with respect to the movement of one tool or the other, instead both tools are always positioned simultaneously, whereby it is also determined at the same time by positioning the work piece either in the first or in the second spindle position that the tool allocated to the first spindle position or the second spindle position is used.

The positioning device may be constructed in any desired manner known for machine tools. Hence, for special types of machining, it would be conceivable, for example, in the case where the tools are movable in a direction which does not correspond to the X-direction, to construct the positioning device in the form of a center sleeve. However, it is particularly advantageous, especially for the tools movable in X-direction, if the positioning device is a tool carriage, on which the tools allocated to the first and the second spindle position of the machining station are disposed.

For example, the tools could always be disposed in a tool change device, e.g. a tool revolving means. However, the solution according to the invention has a particularly advantageous effect if the tools are immovably connected to the positioning device, since in this case in particular the entire expenditure for the tool change device can be dispensed with and a high number of tools can nevertheless be used.

As already mentioned, the positioning device can, in principle, be movable in all directions relative to the work piece standing in the respective spindle position. A particularly advantageous solution, in particular in the case of provision of an X-axis, uses a positioning device which is movable transversely to a drum axis of the spindle drum.

The positioning device is preferably movable in a direction radial to the drum axis in this case.

In order to further increase the number of tools which may be used, it is advantageously provided that two tools are allocated to each spindle position of the at least one machining station.

It is particularly advantageous with respect to the solution according to the invention, in which as simple as possible an operation of the tools is aimed at, if the two tools allocated to a spindle position are movable jointly.

In this case, the two tools are preferably arranged in relation to one another so that they may be alternately used on the work piece.

A particularly advantageous solution provides that the two tools allocated to a spindle position are movable along parallel tool paths, preferably along a joint tool path.

It would be conceivable in principle to arrange the first and the second spindle position at the same angular distance from one another as directly consecutive spindle positions of two different consecutive stations. However, this solution is detrimental to optimum utilization of the advantages according to the invention.

For this reason, it is provided according to the invention that the first and second spindle position of the at least one machining station have an angular distance from one another, which does not equal the angular distance of two directly consecutive spindle positions of two different stations, i.e. that the angular distances between consecutive spindle positions are not equal but different, so that the advantages according to the invention can be used in a particularly optimum manner. A particularly advantageous solution provides that the first and the second spindle position of the at least one machining station have an angular distance from one another which is smaller than 360° divided by the number of spindle positions of all stations. Hence, the spindle positions of each station are arranged at a smaller angular distance than that which would occur if all the spindle positions were distributed uniformly around the drum axis. This allows the tools for the spindle positions of a machining station to be arranged in close proximity to one another.

In principle, the angular distance between the first and second spindle position of each machining station and the angular distance of consecutive spindle positions could be selected independently of one another in the case of consecutive stations. However, for reasons of as simple an actuation of the spindle drum as possible, it is advantageous if the first and the second spindle position have an angular distance from one another which corresponds to an integral fraction of the angular distance between two directly consecutive spindle positions of two directly consecutive stations.

With respect to the selection of the angular distance between the first and the second spindle position of the at least one machining station, it is advantageously provided that the angular distance between the first and the second spindle position is selected so that the work piece standing in one of the spindle positions may be machined therein in a collision-free manner relative to the tool in the other spindle position of this machining station.

No further details have so far been given with respect to the arrangement of the work piece spindles in association with the previous explanation of the individual embodiments. Hence, it is advantageously provided that the work piece spindles and the stations are arranged at constant angular distances from one another on the spindle drum.

In principle, it would be possible to arrange the work piece spindles rigidly on the spindle drum, and to perform the axial movements necessary for machining the work pieces by appropriate movement of the tools. However, a particularly advantageous embodiment provides that the work piece spindles are movable in the direction of their spindle axis relatively to the spindle drum in order to achieve a Z-axis movement for machining the work piece. This solution not only has the advantage that an axial movement is shifted to the work piece spindle, but also has the advantage, both with spindle axes running horizontally and those running vertically, that the Z-axis movement of the work piece spindles can be utilized for pick up and set down of the work piece in a work piece transport system, e.g. in a loading and unloading station.

This advantage is especially important if the multiple-spindle turning machine has work piece spindles which run essentially vertically, since then gravity additionally facilitates the handling of the work pieces.

No further details have thus far been given with respect to the tools used in the first and second spindle positions of the machining stations. Hence, it is possible in the case of one-sided machining with a plurality of machining operations, for example, to provide a different tool in each spindle position and to move the individual work piece spindles in a suitable step sequence so that the work piece is passed through each of the spindle positions of all the machining stations.

Alternatively to this, however, it is possible with the solution according to the invention that all the first spindle positions of all the machining stations and all the second spindle positions of all the machining stations have their own set of tools. This solution provides the possibility of initially machining a first type of work piece with tools of the first spindle positions, in which case, for example, all of the first spindle positions can carry different tools. Machining of a second type of work piece then occurs in the second spindle positions. The sets of tools in the first and second spindle position may also be identical. The same is also possible with the first type and the second type of work piece. Upon wear of the tools in the first spindle positions it is then possible to change to the second spindle positions of all the machining stations, and because of the identical set of tools in the second spindle positions, the same machining operations are then possible in the second spindle positions until the tools in the second spindle positions have also become worn.

However, it is also possible alternatively to this to constantly alternate between the set of tools in the first spindle positions or the set of tools in the second spindle positions so that both sets of tools are worn evenly.

Thus, the solution according to the invention provides the possibility of achieving double the running time compared to the solutions known from the prior art without a tool change being necessary.

The multiple-spindle turning machine according to the invention can be constructed so that only parts on one side are to be machined. This is the simplest possible use of a multiple-spindle turning machine.

The multiple-spindle turning machines according to the invention may be used particularly expediently with work pieces which are to be machined on both sides.

For this, it is advantageously provided that work piece spindles arranged consecutively in the direction of rotation are alternately provided with a receiving means for a first side and a receiving means for a second side of a work piece, so that consecutive work piece spindles alternately carry work pieces which are to be machined on different sides.

Such machining of the work piece on the first and the second side has consequences for the tools to be used insofar as the corresponding tools must be suited to the machining provided in the respective spindle position.

Hence, an advantageous embodiment provides that the tools provided in the spindle positions of the machining stations are suitable both for machining the first and the second side of the work piece.

Another advantageous solution provides that one of the spindle positions of the at least one machining station has a tool machining only one side of the work piece. This provides the possibility of machining only one side of the work piece in this spindle position and thus also of arranging a suitable tool specially provided for this side, while there are no obligatory given requirements for the tool to be used in the other spindle position of the same machining station. Hence, it is possible, for example, to arrange a tool machining both sides of the work piece in the other spindle position of the machining station, or alternatively to also provide a tool only machining one side of the work piece.

However, it is also possible with the solution according to the invention that tools only for the first side of the work piece are allocated to both spindle positions of one of the machining stations and tools only for the second side of the work piece are allocated to the two spindle positions of another machining station. This solution has the great advantage that, on the one hand, the tools are clearly allocated to the individual machining operations of the individual sides, and on the other hand the solution according to the invention provides the substantial advantage here that at least two tools, namely one in each respective spindle position, are available per station for machining.

A particularly favourable solution with respect to machining of the work pieces provides that the other machining station is the machining station following the one machining station.

In addition, the invention relates to a process for the production of turned parts, in which work pieces are received as blanks in work piece receiving means of a number of work piece spindles, which are arranged on a spindle drum and upon rotation of thereof are movable in a direction of rotation around a spindle drum axis, and are machined in at least one machining station, whereby the machining station is a number of stations arranged consecutively on the machine frame corresponding to the number of work piece spindles, and in which according to the invention a first machining operation is carried out in the machining station with a first tool in a first spindle position, and a second machining operation is carried out with a second tool in a second spindle position arranged at an angular distance relative to the first spindle position in the direction of the rotation.

The advantage of the process according to the invention is that, in the same manner as in the case of the multiple-spindle turning machine according to the invention—in particular upon use of one of the above-mentioned embodiments—, the possibility is provided of using more tools on the work piece in as simple a manner as possible.

It is particularly advantageous therein if each of the stations is provided with a first spindle position and a second spindle position, and the first spindle positions and the second spindle positions are respectively arranged one below the other at equal angular distances. As a result of this, in particular where work piece spindles are arranged at equal angular distances, machining operations may be carried out with optimized machining rates, since at least a large number of work piece spindles, preferably all the work piece spindles, always stand in a spindle position, in which machining or handling of the work piece is possible.

With the process according to the invention, a work piece is preferably produced by means of a work piece cycle, which has at least one step sequence with at least one angle step for rotation of the spindle drum.

The work piece may be produced particularly expediently if the work piece cycle comprises several identical step sequences. In the simplest case, each step sequence is formed by an angle step. However, it is particularly advantageous, especially in order to utilize the possibilities of a multiple-spindle turning machine, if each step sequence comprises several angle steps of different magnitude.

The machining of work pieces by means of such a work piece cycle provides that the work piece cycle is ended after passage through a specific number of stations. In this case, a specific number of stations can either comprise an integral fraction of all the stations of the multiple-spindle turning machine, or be equal to the number of stations of the multiple-spindle turning machine, or may also be an integral multiple of the number of stations of the multiple-spindle turning machine.

In principle, the step sequence can comprise any desired angle steps. An advantageous embodiment of a solution according to the invention provides that the sum of the angle steps of a step sequence amounts to an integral multiple of 360° divided by the number of work piece spindles. In this case, it is particularly simple to combine the step sequences to form a work piece cycle, which is compatible with the number of stations of the multiple-spindle turning machine.

Several different processes for machining a work piece may be carried out using the multiple-spindle turning machine according to the invention.

Hence, a particularly advantageous process provides that, when conducting the work piece cycles during a first period of time with the work piece spindles, only the first spindle positions are used, and thereafter only the second spindle positions are used during a second period of time.

In such a process only the work piece cycles are firstly worked by using the first spindle positions, and only thereafter the second spindle positions.

This means that the multiple-spindle turning machine is operated during approach of the first spindle positions in the manner of a conventional multiple-spindle turning machine, and in the same manner during approach of the second spindle position but so as to permit a change from the first to the second spindle positions.

For example, it is conceivable with such a process to select the tools in the first spindle positions so that a first type of work piece is machined utilizing the tools and handling devices allocated to the first spindle positions, and directly subsequent thereto, without the machine having to be retooled, a second type of work piece is machined upon use of the second spindle positions and utilization of the tools and handling devices allocated to the second spindle positions.

However, it is also conceivable in another solution that the first period of time is determined by abrasion or wear of the tools in the first spindle positions. In this case, the same set of tools is arranged in the second spindle positions as in the first spindle positions, and therefore work pieces may continue to be machined with less abraded or less worn tools by a change from the first spindle positions to the second spindle positions.

Machining in the second spindle positions preferably occurs during a second period of time, which is then likewise determined by the abrasion or wear of the tools in the second spindle positions.

The first and second periods of time may be determined so that partial wear of the tools respectively occurs, or so that full wear of the tools respectively occurs.

A further version of the process according to the invention provides that the individual work piece spindles are passed one after the other through all the consecutive spindle positions in the direction of rotation. This means that the rotation of the spindle drums occurs in such a way that the work piece spindles always reach the next following spindle positions in the direction of rotation.

The above-described versions of the process according to the invention may also be carried out, for example, when a work piece is machined on a first side and a second side.

This machining preferably occurs because the work pieces are alternately received in respectively consecutive work piece spindles in the direction of rotation for machining the first side and machining the second side.

It is preferably provided in this case that a next following spindle position in the direction of rotation is skipped with at least one of the angle steps of the step sequence. Such a version of the process according to the invention provides the possibility of permitting machining solely on one side of the work pieces in the respectively skipped spindle position, thus also enabling tools to be used which are suited solely to machining the one side.

In principle, it is possible with such a version of the process according to the invention to only skip the next following spindle position in the direction of rotation. However, it is also possible to skip the two next following spindle positions in the direction of rotation or even three of the next following spindle positions in the direction of rotation.

The above-mentioned versions of the process according to the invention could either be carried out so that each of the angle steps of the step sequence serves to skip a next following spindle position.

However, according to the invention, the above-described versions may also be combined with an angle step, in the case of which a change occurs from one spindle position to the next following spindle position in the direction of rotation.

Individually, the versions of the process according to the invention may, for example, be constructed so that the step sequence comprises an angle step, in the case of which a change occurs from a first spindle position to a second spindle position.

Moreover, a step sequence having such an angle step may, for example, be combined with an angle step, in the case of which a change occurs from a second spindle position to a first spindle position.

In this case, the change from a first spindle position to a second spindle position preferably occurs within a single station and the change from a second spindle position to a first spindle position occurs during the transition from one station to a following station.

Another advantageous solution according to the invention provides that the change from a first spindle position to a second spindle position and the change from the second spindle position to the first spindle position respectively occur during the transition from one station to a following station.

Another solution provides that the change from a first spindle position to a second spindle position occurs within one station, and the change from the second spindle position to a first spindle position occurs during the transition from one station to the next station but one.

Further features and advantages of the invention are the subject of the following description as well as the drawings representing some embodiments.

BRIEF DESCRIPTION OF THE DRAWINGS

FIG. 17 A table providing specifications for different versions of the inventive process.

DETAILED DESCRIPTION OF THE INVENTION

Figure 1:
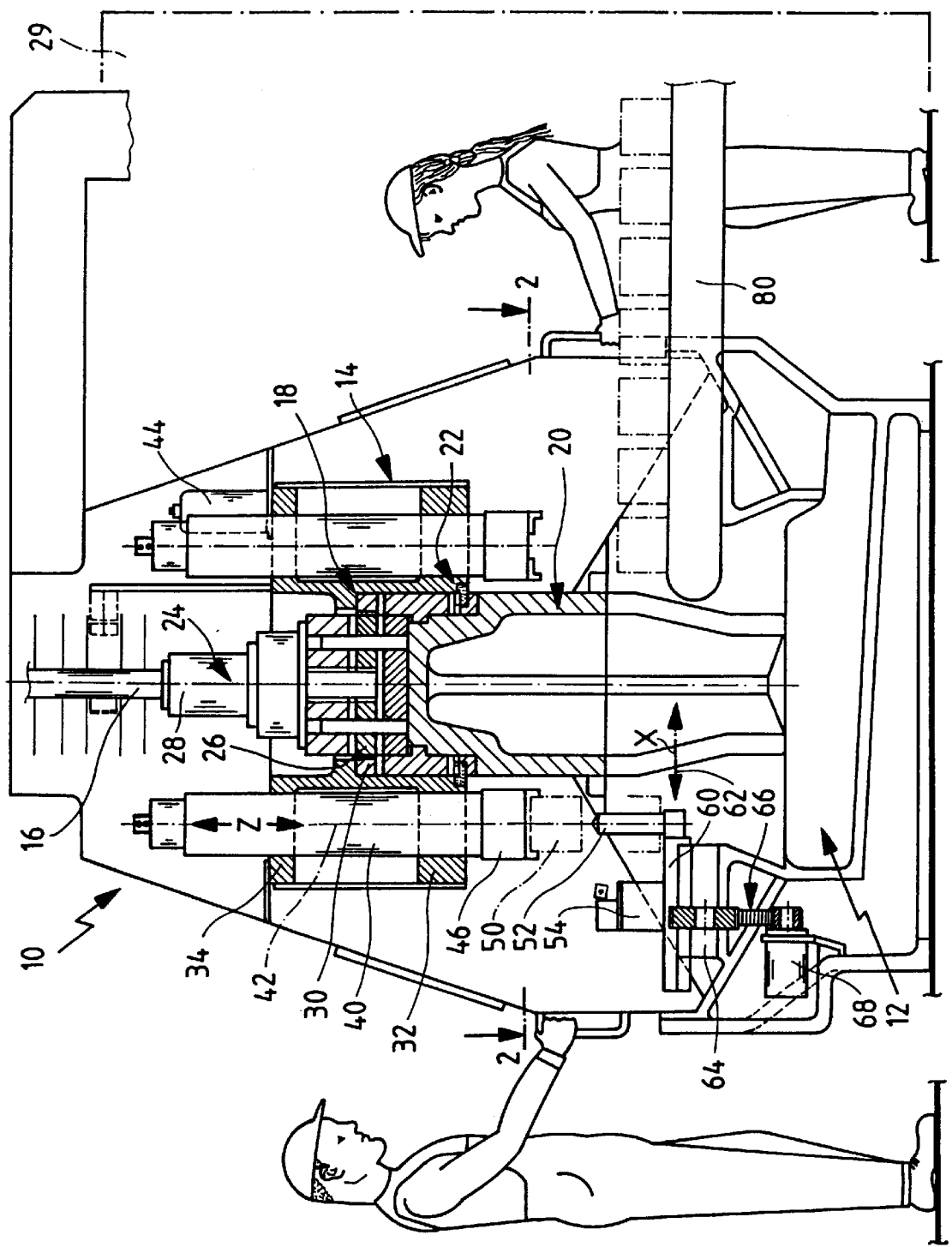
FIG. 1 a vertical section through a multiple-spindle turning machine or lathe according to the invention.

An embodiment of a multiple-spindle turning machine or lathe shown in FIG. 1 and given the overall reference 10 comprises a machine frame 12, on which a spindle drum 14 is mounted so as to be rotatable around a vertical drum axis 16.

The rotatable mounting of the spindle drum 14 is achieved, for example, by a bearing unit 18, which is not described in detail, whereby the bearing unit 18 is supported on a stand 20 of the machine frame so that the stand 20 supports and provides a rotatable mounting for the spindle drum 14 via the bearing unit 18. Moreover, a serration 22 is provided to lock the spindle drum 14 in individual rotational positions.

For rotation of the spindle drum 14 relative to the machine frame 12, for example, in a direction of rotation 23, a rotary drive given the overall reference 24 is provided, which has a drive motor 28 driving a planetary gear 26, whereby a crown gear 30 connected to the spindle drum 14 may be driven via the planetary gear 26.

The drive motor 28 may be controlled by means of an NC system 29 so that rotation of the spindle drum 14 is possible around precisely definable angle steps S.

The mounting of the spindle drum 14 need not be achieved via the stand 20 of the machine frame 12 as in the embodiment illustrated, but may also be achieved on the peripheral side of the spindle drum 14, as is shown in the German patent applications 195 04 369.3 and 195 04 371.5, for example, and reference is hereby made to the full contents of these documents.

The spindle drum 14 in turn comprises a lower guide flange 32 and also an upper guide flange 34, on which a plurality of the work piece spindles 40 is displaceably mounted in the direction of their vertical spindle axis 42, whereby the spindle axis 42 preferably runs parallel to the drum axis 16, but may also run on an incline at an acute angle relative to this.

For movement of the work piece spindles 40 in the direction of their spindle axis 42 controllable by means of the NC system 29, each of the work piece spindles 40 is provided with its own linear drive 44 on the spindle drum 14 to permit displacement of the respective work piece spindle 40 as a whole, preferably together with an installed spindle motor, in the direction of the spindle axis 42. An embodiment of such a linear drive 44 is described in detail, for example, in the German patent applications 195 04 369.3 and 195 04 371.5.

Each of the work piece spindles 40 bears on its front, lower end in the case of vertical work piece spindles, a work piece receiving means 46 for receiving a work piece 50 to be machined, in which case the work piece receiving means 46 is constructed as clamping chuck, for example, but may also be constructed in the form of a collet chuck, for example.

The work pieces held in the work piece receiving means 46 of the work piece spindles 40 are arranged to face tools 52 and/or 54 provided in machining stations, whereby the tools 52 and/or 54 sit on a tool carriage 60 which may itself be moved linearly in one direction 62. The direction 62 runs transversely, preferably perpendicular, to the spindle axis 42 of the work piece spindle 40 standing in a spindle position, in which machining with the tools 52 or 54 of the tool carriage 60 is possible.

Each tool carriage 60 of a machining station is in turn mounted on a carriage guide 64 firmly disposed on the machine frame 12 and may be driven via a linear drive, given the overall reference 66 and controlled by the NC system 29, said linear drive preferably having a drive motor 68, which in turn drives a spindle drive (not shown in detail in the drawing) via a gear for displacement of the tool carriage 60.

During machining of the work piece 50 received in the work piece receiving means 46 of each work piece spindle 40, the axial movement possible as a result of the displaceability of the work piece spindle 40 along its spindle axis 42 forms the Z-axis while the axial movement possible as a result of the displaceability of the tool carriage 60 in direction 62 forms the X-axis, so that normal turning operations may be carried out in each spindle position of a machining station as a result of the relative movement of the work piece 50 to the tools 52 or 54.

Figure 2:
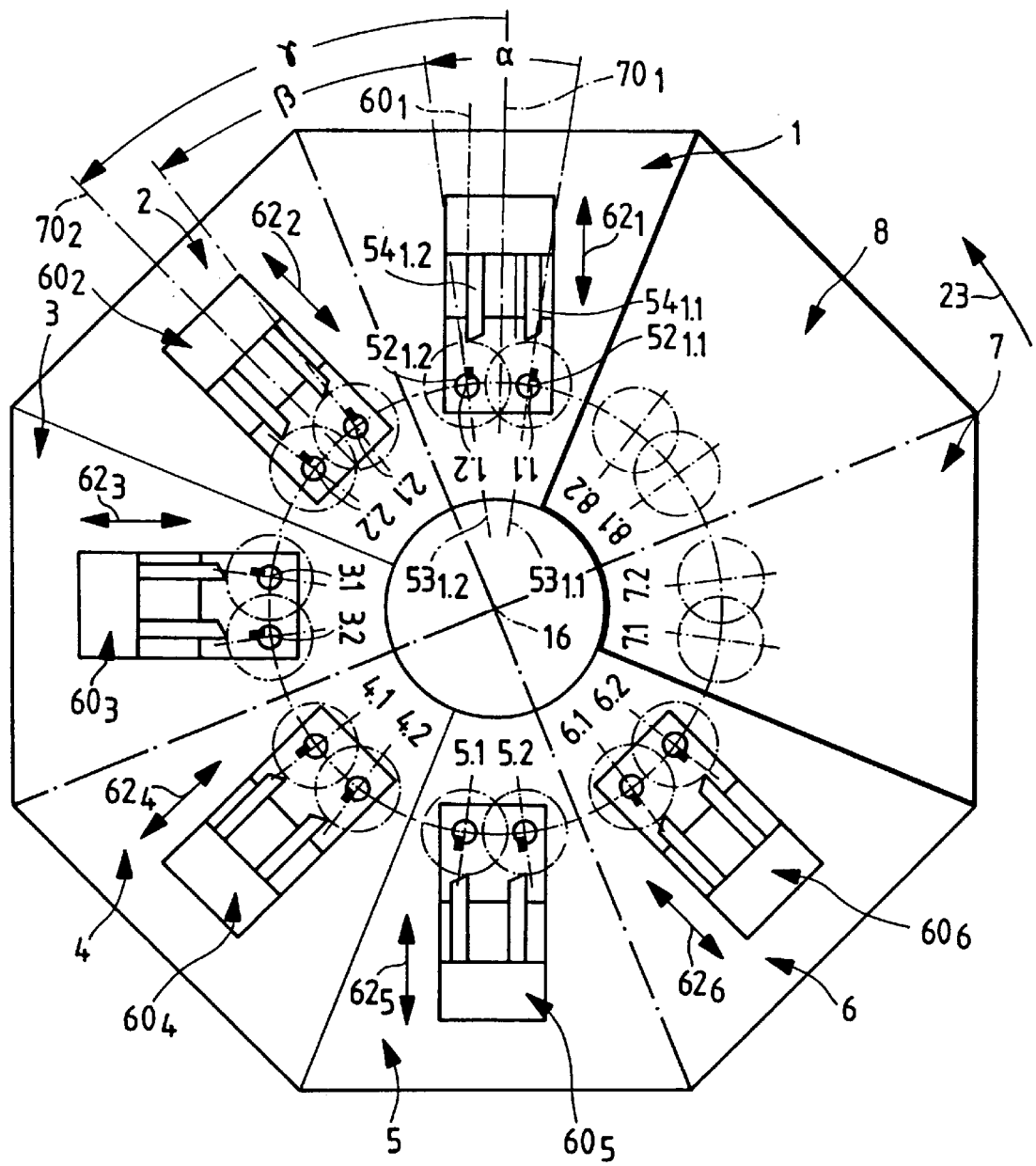
FIG. 2 a horizontal section taken along line 2—2 in FIG. 1.

To carry out machining of the work pieces 50 held in the work piece receiving means 46 of the work piece spindles 40, several stations 1 to 8 are provided on the machine frame 12, as shown in FIG. 2, whereby stations 1 to 6 are machining stations, for example, and stations 7 and 8 are loading and unloading stations for loading and unloading the work pieces 50, for example.

In each of the machining stations 1 to 6 a single tool carriage $60_1$ to $60_6$ is respectively arranged which is respectively movable in the corresponding direction $62_1$ to $62_6$.

In this case, the tool carriages $60_1$ and $60_6$ are disposed in machining stations 1 to 6 so that their central axes or axes of symmetry $70_1$ to $70_6$ are arranged at an angular distance γ from one another, which in the case of the total of eight stations 1 to 8 respectively amounts to 45°.

The spindle drum 14 is provided with a number of work piece spindles 40 arranged at equal angular distances γ from one another, which corresponds to the number of stations 1 to 8, so that in the case of 8 stations, 8 work piece spindles 40 are also arranged on the spindle drum 14.

According to the invention, not every one of the stations 1 to 8 is provided with only a single spindle position. Instead, each of the stations 1 to 8 has two spindle positions 1.1 and 1.2 or 2.1 and 2.2 . . . 8.1 and 8.2, in which the work piece spindles 40 of the spindle drum 14 may be positioned.

For example, as shown in FIG. 2, all the work piece spindles 40 of the spindle drum 14 may respectively be positioned in the first spindle position 1.1, 2.1, 3.1, 4.1, 5.1, 6.1, 7.1, 8.1 of the individual stations 1, 2, 3, 4, 5, 6, 7, 8, or in the second spindle position 1.2, 2.2, 3.2, 4.2, 5.2, 6.2, 7.2, 8.2, which presupposes that the consecutive first spindle positions 1.1, 2.1 . . . 8.1 are arranged amongst themselves at an angular distance γ from one another, and also the consecutive second spindle positions 1.2, 2.2 . . . 8.2.

This has the further consequence that the first spindle position 1.1 . . . 8.1 and the second spindle position 1.2 . . . 8.2 of the respective station 1 . . . 8 are respectively arranged at the same angular distance α from one another, while the second spindle position 1.2 . . . 8.2 is arranged in relation to the respective next following first spindle position 2.1 . . . 1.1 of the next following stations at an angular distance β, which is also respectively the same between all consecutive second spindle positions 1.2 . . . 8.2 and the following first spindle positions 2.1 . . . 1.1.

The angle α preferably amounts to half the angle β so that in the described embodiment α is equal to 15° and β is equal to 30°, since the angular distance γ amounts to 45°.

To enable the work piece 50 to now be machined in both spindle positions 1.1, 1.2 . . . 6.1, 6.2 of all the machining stations 1 . . . 6, each of the spindle positions 1.1, 1.2 . . . 6.1, 6.2 is allocated at least one tool $54_{1.1}$, whereby both tools $54_{1.1}$ and $54_{1.2}$ are mounted as stationary tools on the same carriage $60_1$, and thus may also only be moved jointly in direction 62. In this case, each tool moves on its own tool path $53_{1.1}$ or $53_{1.2}$ running parallel to direction 62.

In each of the machining stations 1 to 6, direction 62 preferably runs parallel to a radial direction to the drum axis 16 lying between the two spindle positions 1.1 and 1.2, whereby the radial direction in particular lies symmetrically between the two spindle positions 1.1 and 1.2 and coincides with the line of symmetry 70. The same applies to all the other machining stations 2 to 6.

A particularly preferred embodiment not only provides a tool $54_{1.1}$ or $54_{1.2}$ on the respective carriage $60_1$ for each spindle position 1.1 and 1.2 of a machining station, but in addition respectively provides a further tool also moving along the respective tool path $53_{1.1}$ or $53_{1.2}$, namely tools $52_{1.1}$ or $52_{1.2}$, whereby by moving the carriage 60 in direction 62, either one of tools 54 or one of tools 52 may be used on the work piece 50 in the respective spindle position 1.1 or 1.2.

In the case shown in the example, the tools 54 are external turning tools, while tools 52 are drill rods.

However, all other types of tools may also be used.

Depending on the rotation of the spindle drum 14 with the work piece spindles 40, a wide variety of machining operations may now be carried out in the individual machining stations 1 to 6.

Figure 3:
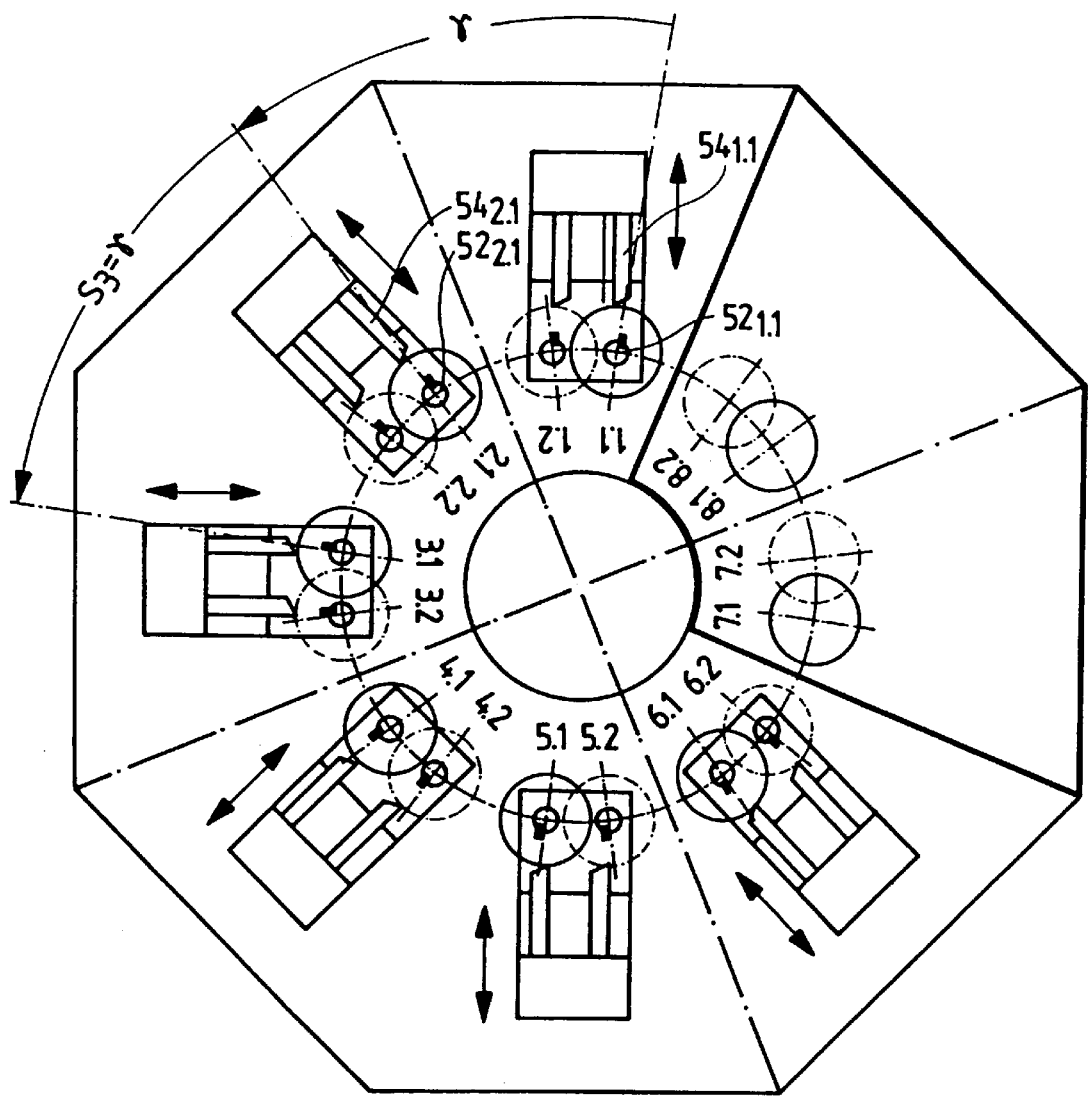
FIGS. 3 and 4 sections similar to FIG. 2 representing a first version of a process according to the invention.
Figure 4:
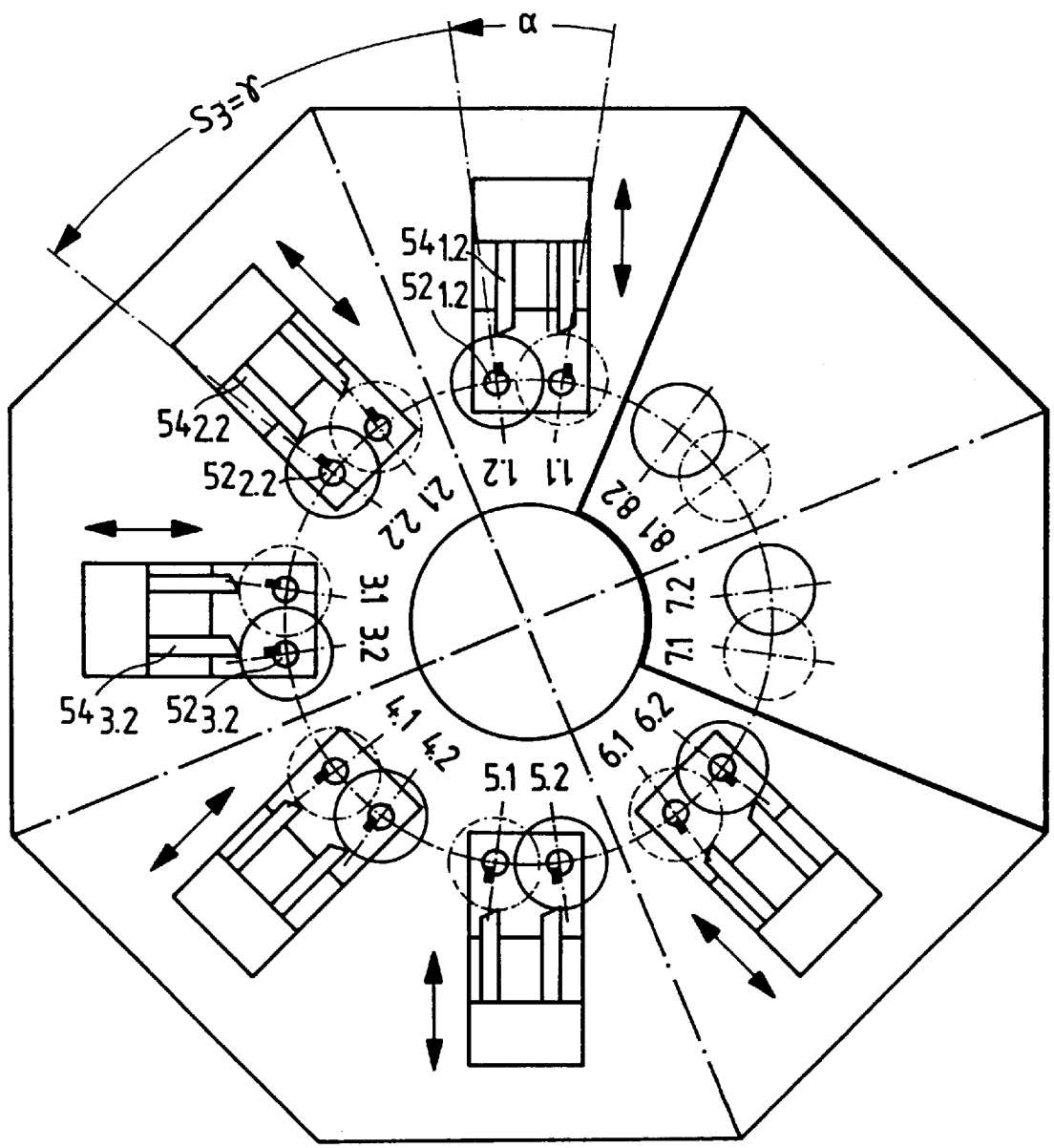

In the case of a first version of a process for machining work pieces 50 using the multiple-spindle turning machine according to the invention—shown in FIGS. 3 and 4—, the work piece spindles 40 are firstly positioned during a first period of time $t_1$ by rotating the spindle drum 14 around always equal-sized angle steps $S_3$ of magnitude γ constantly in the first spindle positions 1.1, 2.1, 3.1, 4.1, 5.1, 6.1, 7.1, 8.1 (drawn in solid bold lines in FIG. 3) of stations 1 to 8, so that machining of the work pieces 50 by means of tools $52_{1.1}$ to $52_{6.1}$ and/or $54_{1.1}$ to $54_{6.1}$ occurs in machining stations 1 to 6. In this case a work piece cycle comprises eight like step sequences, whereby each step comprises one angle step $S_3$.

Stations 7 and 8 are constructed as loading and unloading stations, in which case the supply and discharge of work pieces 50 occurs via a work piece transport system 80. In this case, the work piece transport system 80 should be constructed so that in one spindle position of a station, e.g. spindle position 7.1, it takes up the machined work pieces 50 for discharge and in spindle position 8.1 of the next station 8, holds the rough work pieces 50 ready for transfer, whereby access is achieved through a Z-axis movement of the work piece spindle 40 with the work piece receiving means 46.

If, after expiry of the period $t_1$, the tools $52_{1.1}$ to $52_{6.1}$ and/or $54_{1.1}$ to $54_{6.1}$ are abraded by wear, then the multiple-spindle turning machine can continue to operate, since rotation of the spindle drum 14 around an angle step $S_1$ corresponding to the angle α provides the possibility of continuing to machine the work pieces 50 in the second spindle positions 1.2 to 6.2 (drawn in solid bold lines in FIG. 4) of the machining stations (1 to 6).

For this, the second spindle positions 1.2 to 6.2 are provided with the same tools 52 and 54 as the first spindle positions 1.1 to 6.1, so that while retaining the angle steps $S_3$ of magnitude γ, machining may then be continued over the second period of time $t_2$ until the tools 52 and 54 in the second spindle positions 1.2 to 6.2 become worn.

In this case, the work piece transport system must be constructed so that work pieces 50 can also be discharged and delivered in the second spindle positions 7.2 and 8.2 of stations 7 and 8.

Figure 6:
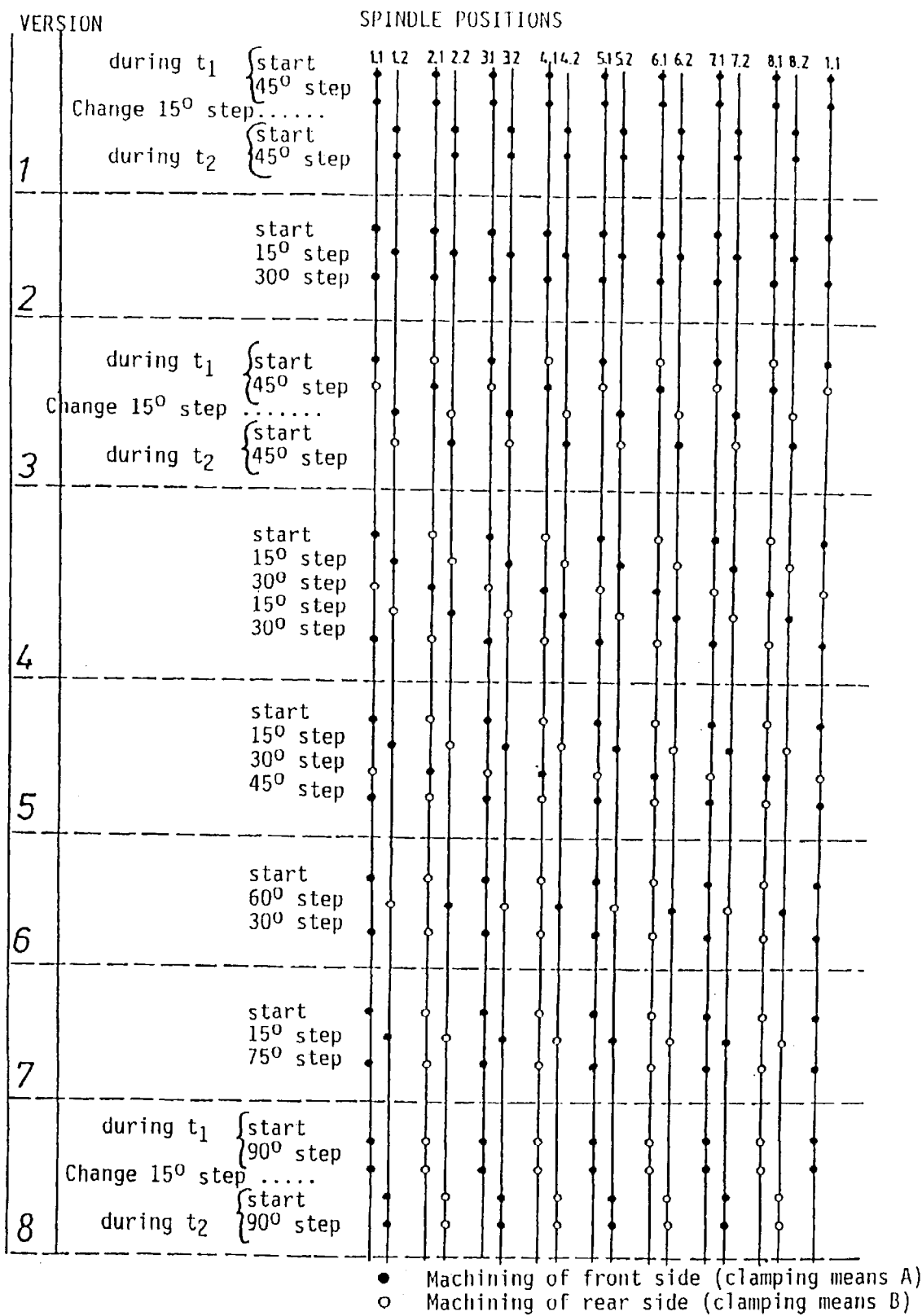
FIG. 6 a schematic representation of the step sequences specifying the angle steps in all versions of the process according to the invention.

The spindle positions approached during machining of a work piece 50 according to the first version of the process according to the invention with work piece spindles 40 are evident from FIG. 6 which provides an important overview.

If machining periods are long, then it is also possible to provide delivery and discharge of the work pieces 50 only in station 8, so that stations 1 to 7 are available for machining.

The possibilities of the first version of the process according to the invention are summarized in Table 1, whereby Table 1 shows that tools 52 or 54 or tool pairs 52 and 54 may be used for machining the work pieces 50, depending on the structure of the handling means 12 or 14.

Figure 5:
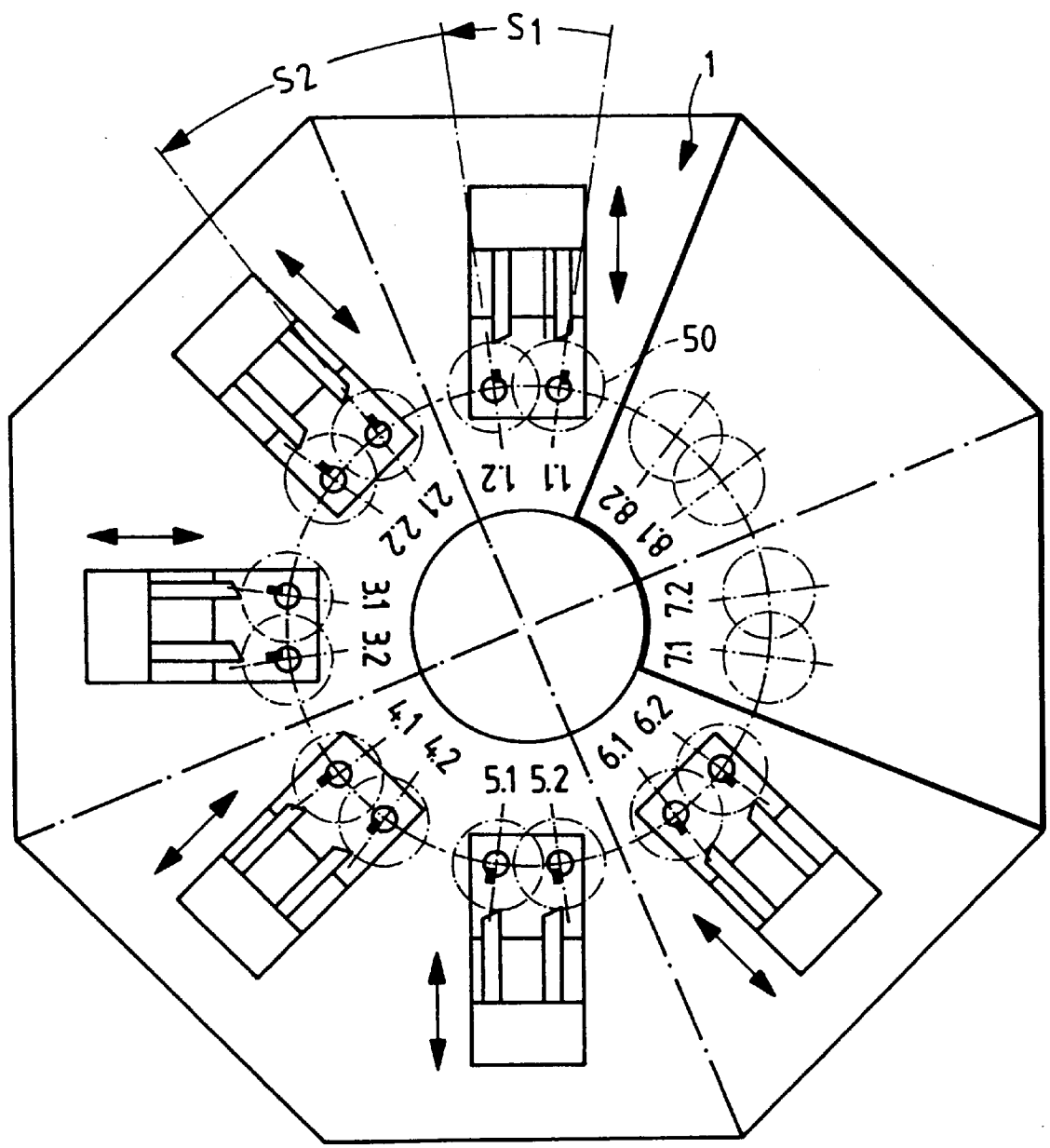
FIG. 5 a section similar to FIG. 2 representing a second version of the process according to the invention.

A second and also simple version of the process according to the invention for machining work pieces 50 in all spindle positions, shown in FIG. 5, provides that beginning, for example, with machining of the work piece 50 in the first spindle position 1.1 of machining station 1, external machining of the work piece 50 is then carried out with the tool $54_{1.1}$ and subsequently machining is carried out with tool $52_{1.1}$ after moving the carriage $60_1$.

Rotation of the spindle drum 14 then occurs in the form of a first angle step $S_1$, so that the work piece 50 no longer stands in the first spindle position 1.1 but in the second spindle position 1.2 of the machining station 1, and may be also be machined in this by means of tools 52 and 54.

Further rotation of the work piece 50 into the first spindle position 2.1 of machining station 2 then occurs in the form of an angle step $S_2$, and after this, a change to the second spindle position 2.2 thereof is achieved in turn in the form of an angle step $S_1$.

In this way, with a work piece cycle comprising eight times the step sequences $S_1+S_2$ with the angle steps $S_1$ and $S_2$ all the spindle positions 1.1, 1.2 . . . 6.1, 6.2 of all the machining stations 1 to 6 can be passed through.

For example, such a procedure is advantageous when as large a number of tools as possible is to be used, in which case two sets of tools 52 and 54 are provided in each machining station, so that by continuing to switch from the first spindle position 1.1 to the second spindle position 1.2 and by further machining with tools 52 and 54, the number of possible tools may be doubled, in contrast to the multiple-spindle turning machine known from the prior art, in which without special measures in a machining station, machining can be carried out in only one spindle position.

In the same manner as in the machining of work piece 50 in the first spindle position 1.1 of the first machining station, the machining of a work piece 50 occurs at the same time in the spindle position 2.1 of machining station 2, and so on as far as machining station 6. Because a respective work piece spindle 40 stands in each of the machining stations 1 to 6, the continued switching of all work pieces 50 machined in all the machining stations 1 to 6 occurs simultaneously with the implementation of the described switching steps $S_1$ and $S_2$.

As shown in the overview according to FIG. 6, in the second version of the process according to the invention, all the spindle positions are used with the work piece spindles 40 in each passage through stations 1 to 8.

Table 1 of FIG. 17 shows that, in the second version of the process according to the invention, not only can stations 7 and 8 be used as an input-output station, but also when only station 8 is used, as an input-output station.

Depending on the number of input-output stations, the number of stations which may be used as machining stations, and with it the number of tools which may be used, also changes. These amount to a maximum of 12 tools 52 or 54 or tool pairs 52 and 54 in the case of six machining stations, or 14 tools 52 or 54 or tool pairs 52 and 54 in the case of seven machining stations.

However, the solution according to the invention may be applied particularly advantageously when a front side and a rear side must be machined in the turning machine according to the invention.

Figure 7:
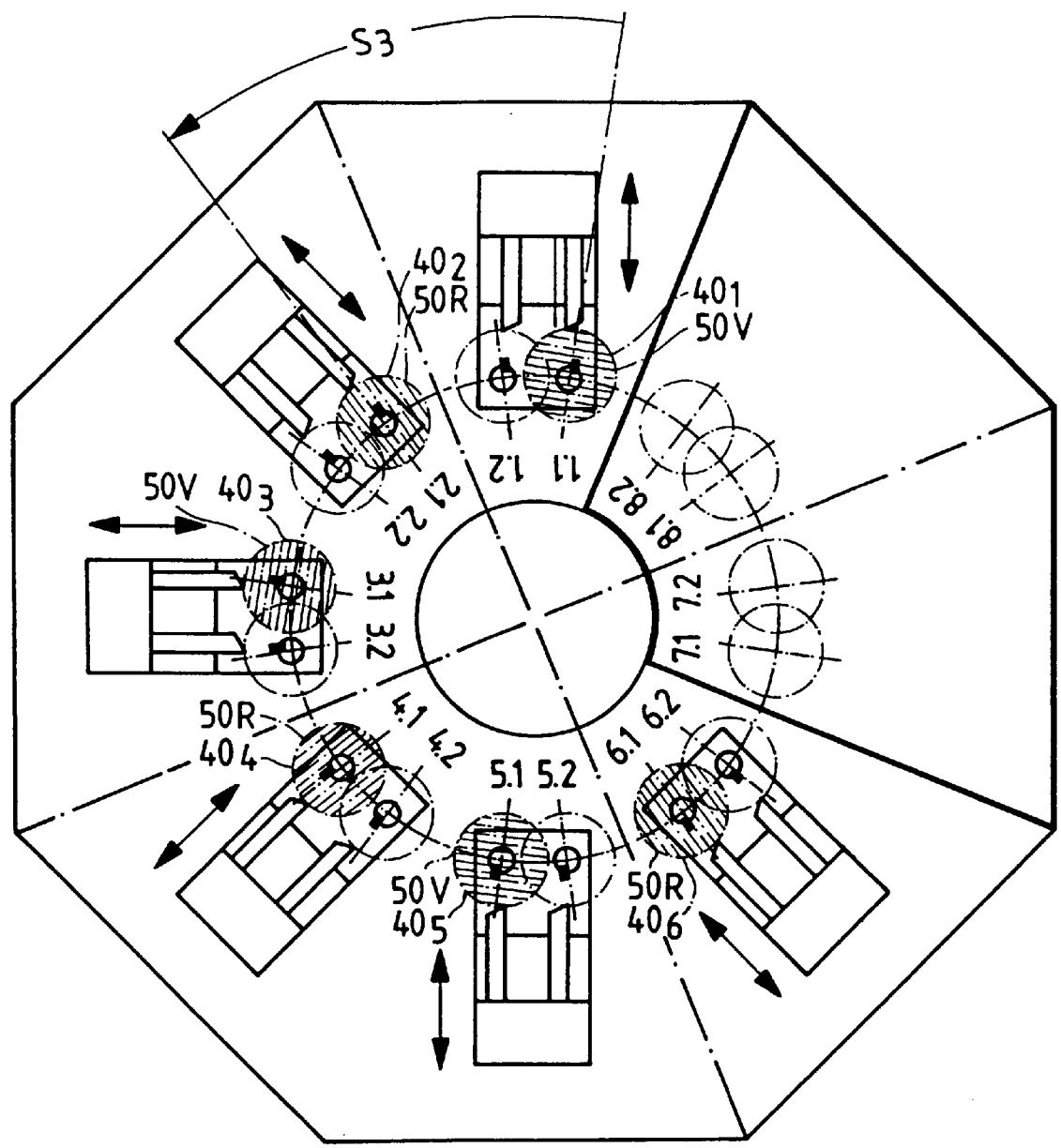
FIG. 7 a section similar to FIG. 2 representing a third version of the process according to the invention.

In a third version of the process according to the invention, as shown in FIG. 7, for example, the work pieces 50 are clamped on different sides. For example, a work piece 50V (azimuthal hatching) is clamped in the work piece spindle $40_1$ in such a way as to permit machining of its front side, while in the directly following work piece spindle $40_2$, a work piece 50R (radial hatching) is clamped so as to permit machining of its rear side. This continues over the further machining stations 3 to 6 and work piece spindles $40_3$ to $40_6$. Thus, work piece 50V is then clamped in the work piece spindle $40_3$ for machining of its front side, for example, work piece 50R is clamped in the work piece spindle $40_4$ for machining its rear side, and so on as far as work piece spindle $40_8$.

The angle steps $S_3$ as well as the work piece cycle and the step sequence of the first version are retained in the third version of the process according to the invention.

As is evident in FIG. 6 and Table 1, clamped work pieces 50V for front side machining and clamped work pieces 50R for rear side machining are provided in succession in consecutive work piece spindles in such a process, whereby on repeated passage through the angle steps $S_3$, the individual work pieces 50V and 50R pass through all the first spindle positions 1.1 to 8.1 of all stations 1 to 8, and after the period $t_1$ has ended, all the second spindle positions 1.2 to 8.2.

Figure 8:
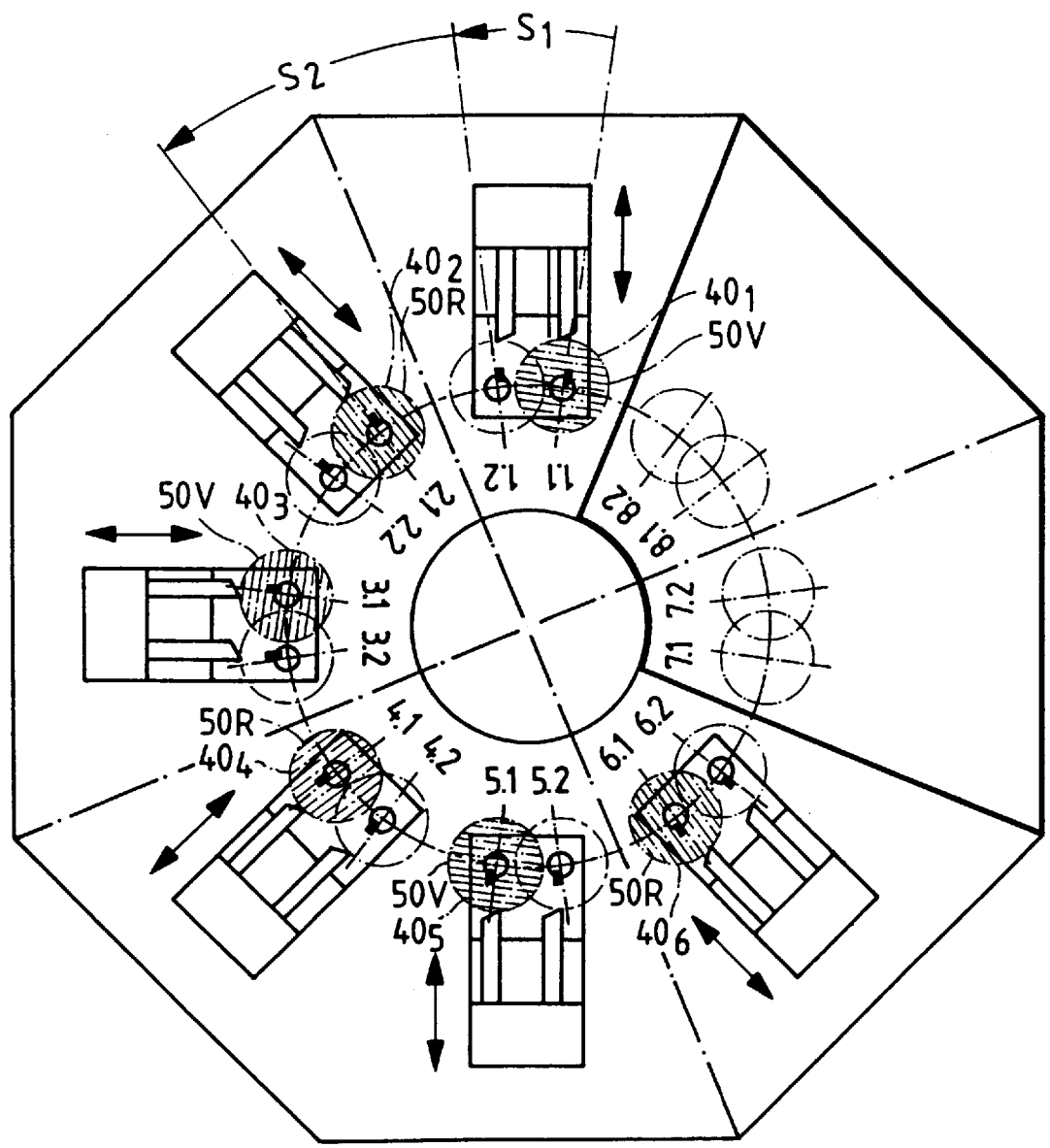
FIG. 8 a section similar to FIG. 2 representing a fourth version of the process according to the invention.

In a fourth version of the process according to the invention, shown in FIG. 8, as described in the case of the third version, consecutive work piece spindles $40_1$ . . . $40_8$ are alternately provided with work pieces 50V and 50R.

The step sequence and angle steps correspond to those of the second version of the process according to the invention, and may be seen from FIG. 6 and Table 1 together with the maximum number of tools which may be used in dependence on the number of the loading and unloading stations.

If the spindle drum 14 is now rotated with the same angle steps $S_1$ and $S_2$ as explained in conjunction with the embodiment according to the second version (FIG. 5), then each of the work pieces 50V and 50R pass through all of the spindle positions 1.1, 1.2, 2.1, . . . to 6.2, so that each of tools 52 and 54 must be constructed so that it is suitable for front side machining and rear side machining.

Figure 9:
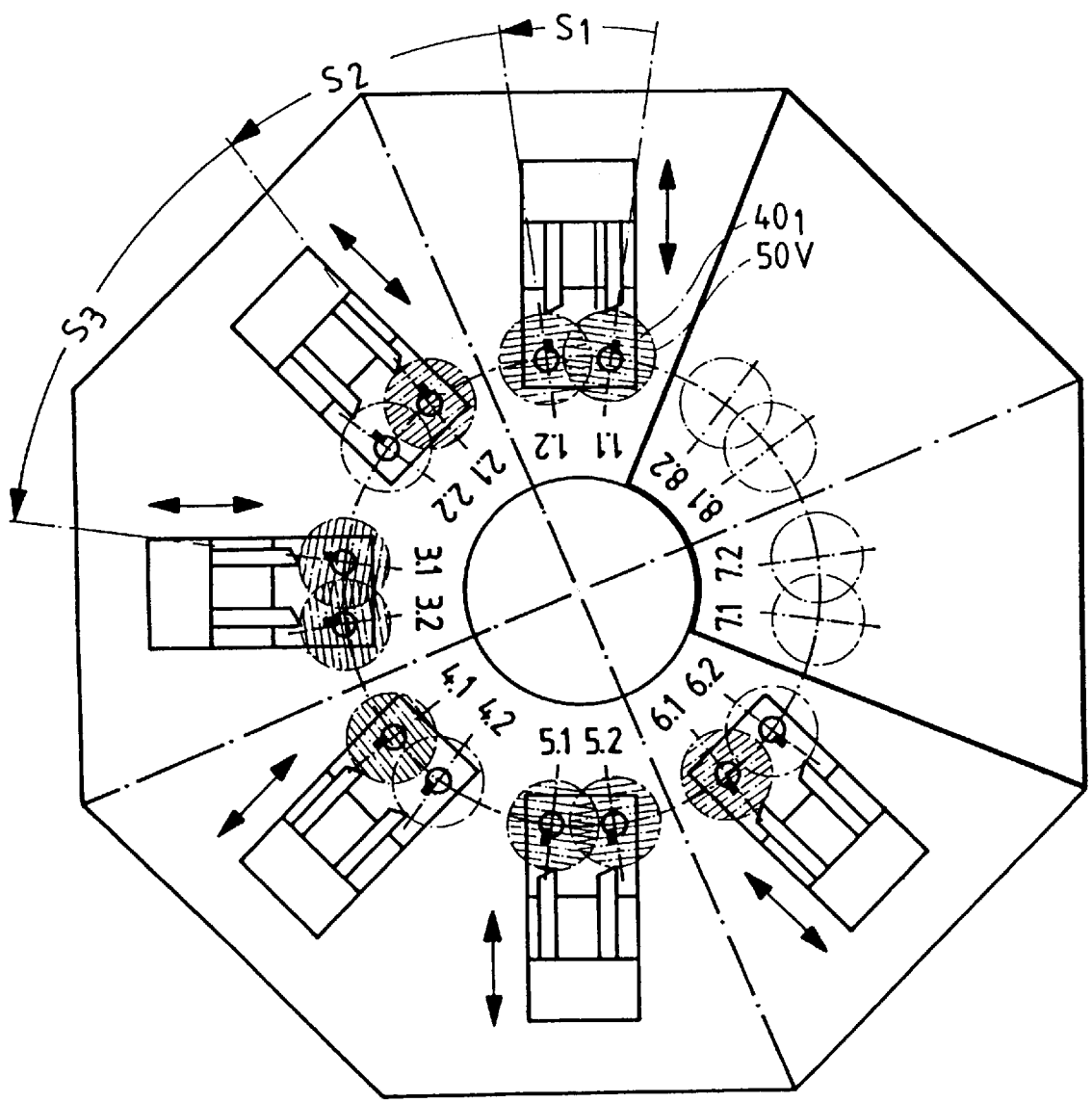
FIGS. 9 and 10 sections similar to FIG. 2 representing a fifth version of the process according to the invention.
Figure 10:
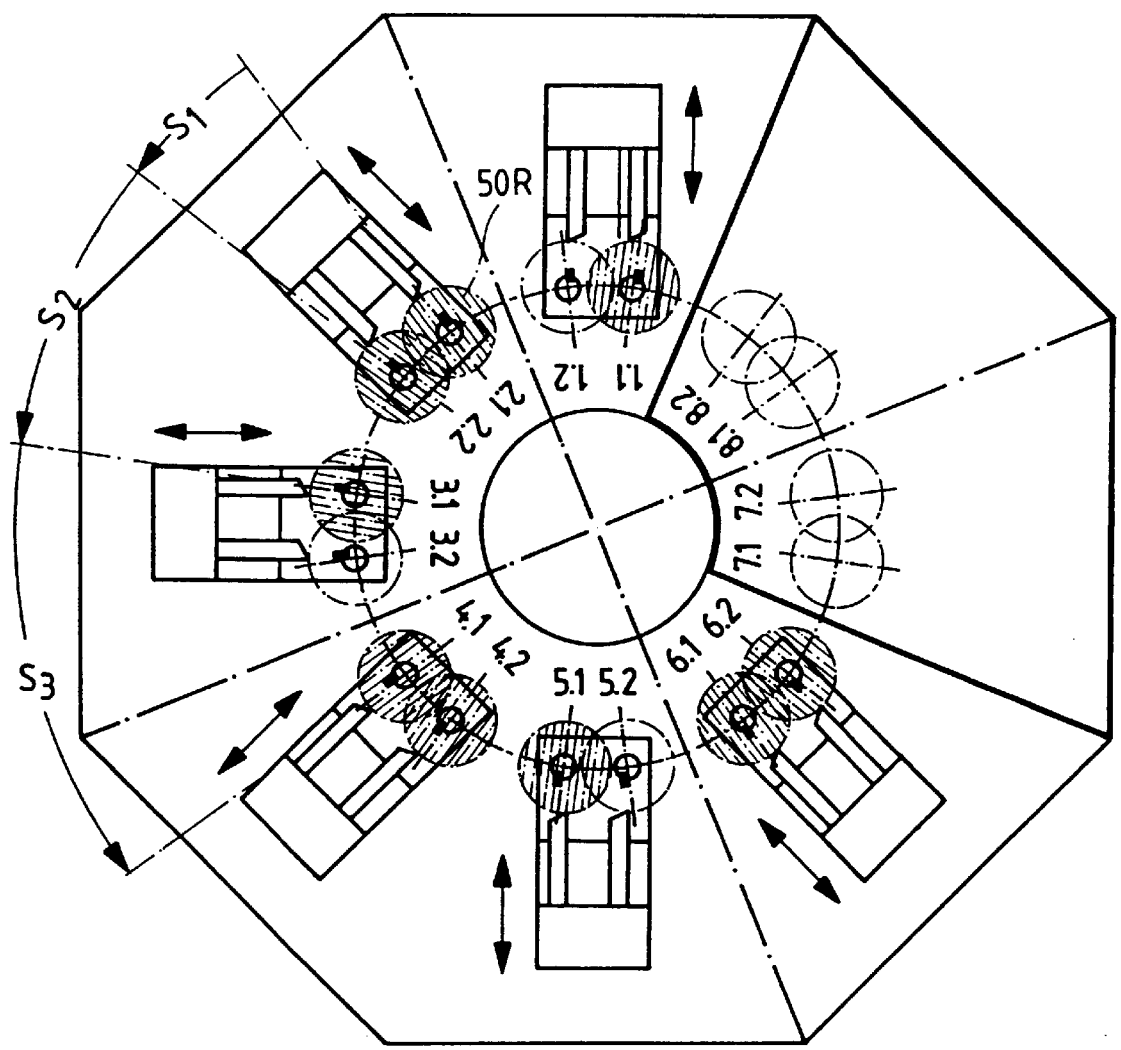

In an embodiment according to the fifth version of the solution according to the invention, shown in FIGS. 9 and 10 by way of example, work pieces 50V and 50R are also clamped in work piece spindles $40_1$ to $40_8$ arranged consecutively in azimuthal direction in the manner already described in conjunction with FIG. 7.

If the spindle drum 14 is now rotated around the switching steps S1 and S2 in the described manner, then the work piece 50V standing initially in the first spindle position 1.1 of the first station 1, for example, passes through the first spindle position 1.1 and the second spindle position 1.2 of the first machining station, and then subsequently the first spindle position 2.1 of the second machining station.

However, subsequent to this an angle step $S_3$ occurs around 45° so that in the case of the step sequence beginning in the first spindle position of a station, the second spindle position 2.2 of the directly following machining station 2 is skipped. After this, both spindle positions 3.1 and 3.2 in the machining station 3 are in turn passed through, and the second spindle position 4.2 in the machining station 4 is skipped.

Hence, a work piece 50V which may be machined on its front side passes through the spindle positions 1.1 and 1.2, 2.1, 3.1 and 3.2, 4.1, 5.1 and 5.2, 6.1 of all the machining stations 1 to 6 and respectively skips the second spindle positions 2.2, 4.2 and 6.2.

In this type of machining, as shown in FIG. 10, work piece 50R, which is provided for rear side machining, passes through in a similar manner, and the step sequence begins, for example, with the work piece spindle $40_2$ in the first spindle position 2.1 of the machining station 2. In this case, the switching steps S1, S2 and S3 cause the spindle positions 2.1, 2.2, 3.1, 4.1, 4.2, 5.1, 6.1, 6.2 and 7.1 to be reached on one full rotation, but not spindle positions 1.2, 3.2, 5.2. If one compares FIG. 9 and FIG. 10, then it is evident that tools 52 and 54 may be provided in the spindle positions 1.2, 3.2 and 5.2, which are ultimately used solely for machining work pieces 50V, while tools may be provided in the spindle positions 2.2, 4.2 and 6.2, which are used solely for machining work pieces 50R, since these spindle positions are not reached by work pieces 50V.

In the case of the fifth version, the step sequence comprises the angle steps $S_1$, $S_2$ and $S_3$, and the work piece cycle comprises, for example, four such identical step sequences.

The number of tools which may be used dependent upon the number of stations for loading and unloading is evident from Table 1 and FIG. 6.

Figure 11:
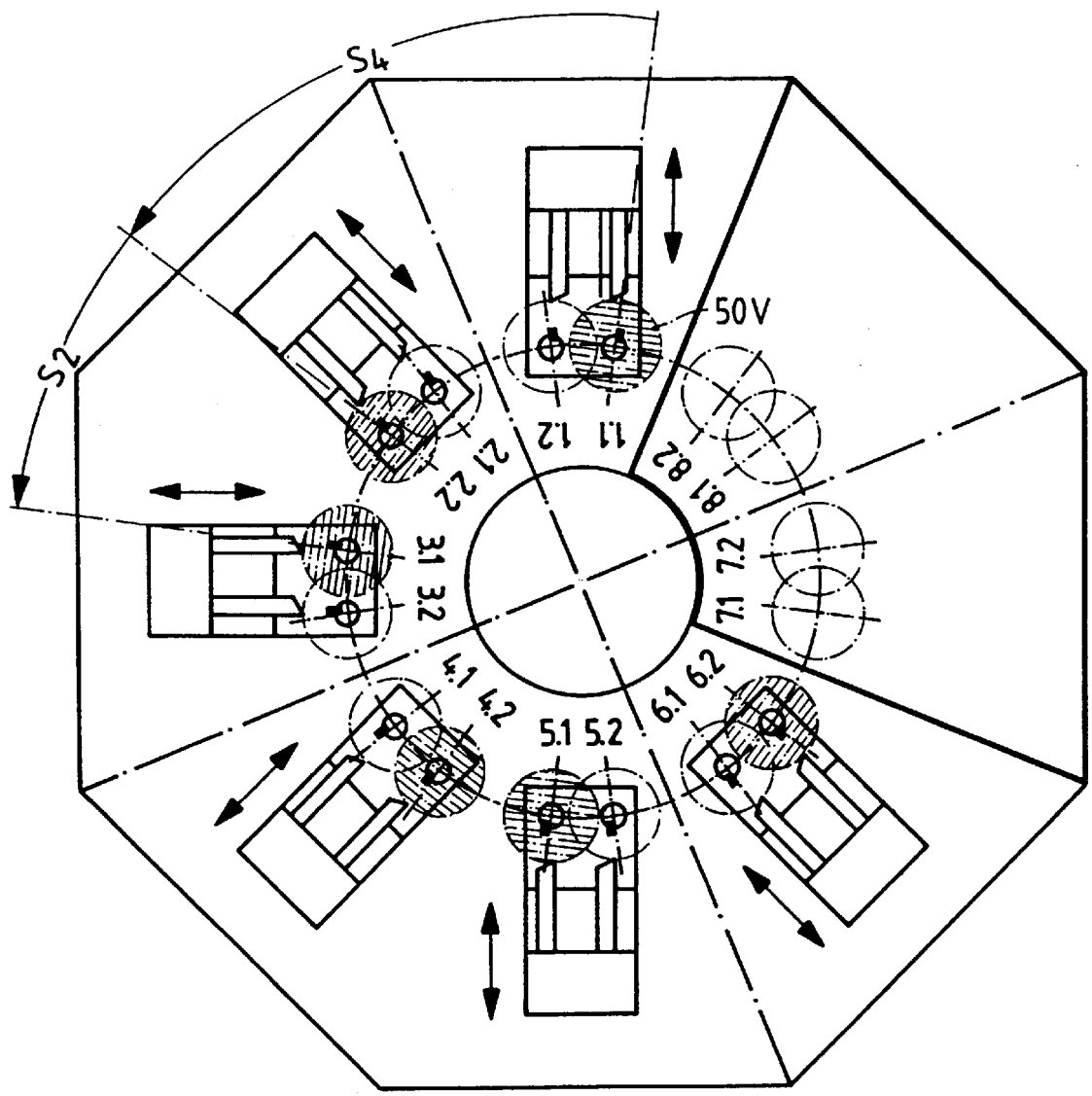
FIGS. 11 and 12 sections similar to FIG. 2 representing a sixth version of the process according to the invention.
Figure 12:
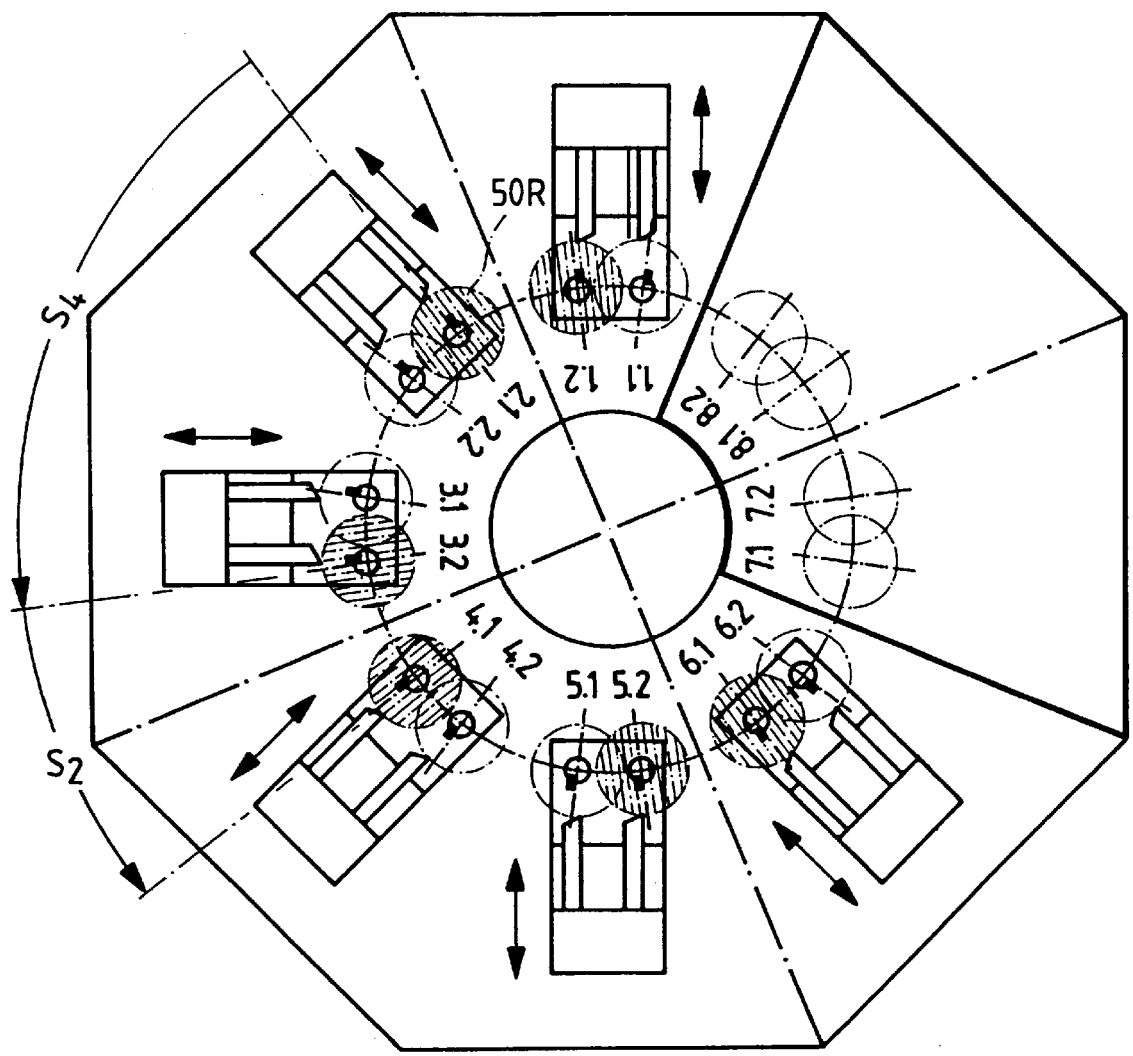

As shown in the case of a sixth version of the process according to the invention in FIG. 11 and FIG. 12, it is possible to completely divide the front and rear side machining over the individual spindle positions. Namely, if, working from a work piece 50V in spindle position 1.1, a first angle step $S_4$ occurs after machining of said work piece in such a way that the work piece 50V is moved from the machining position 1.1 into the spindle position 2.2 and then into machining position 3.1 by means of an angle step $S_2$, then it is evident, as shown in FIG. 12, that the same angle steps $S_4$ and $S_2$ applied to the work piece 50R in the spindle position 2.1 cause this to shift initially into spindle position 3.2 and then into spindle position 4.1.

If these angle steps $S_4$ and $S_2$ are allowed to follow one another in a step sequence, then it is evident that the work piece 50V only passes through spindle positions 1.1, 2.2, 3.1, 4.2, 5.1 and 6.2, and not through spindle positions 1.2, 2.1, 3.2, 4.1, 5.2 and 6.1.

However, as shown in FIG. 12, the work piece 50R passes through spindle positions 1.2, 2.1, 3.2, 4.1, 5.2 and 6.1 overall, and not spindle positions 1.1, 2.2, 3.1, 4.2, 5.1 and 6.2, so that machining of either one of the work pieces 50V or of one of the work pieces 50R can occur overall in the individual spindle positions 1.1 to 6.2, so that also the tools 52 and 54 which may be used in these individual spindle positions can be adapted to the individual machining tasks, either for the front side in the case of a work piece 50V, or the rear side in the case of a work piece 50R.

The step sequence in the sixth version comprises angle steps $S_2$ and $S_4$, in which case four such step sequences form one work piece cycle.

The number of tools which may be used in the sixth version dependent on the number of the stations provided for loading and unloading is evident from FIG. 6 in conjunction with Table 1.

Figure 13:
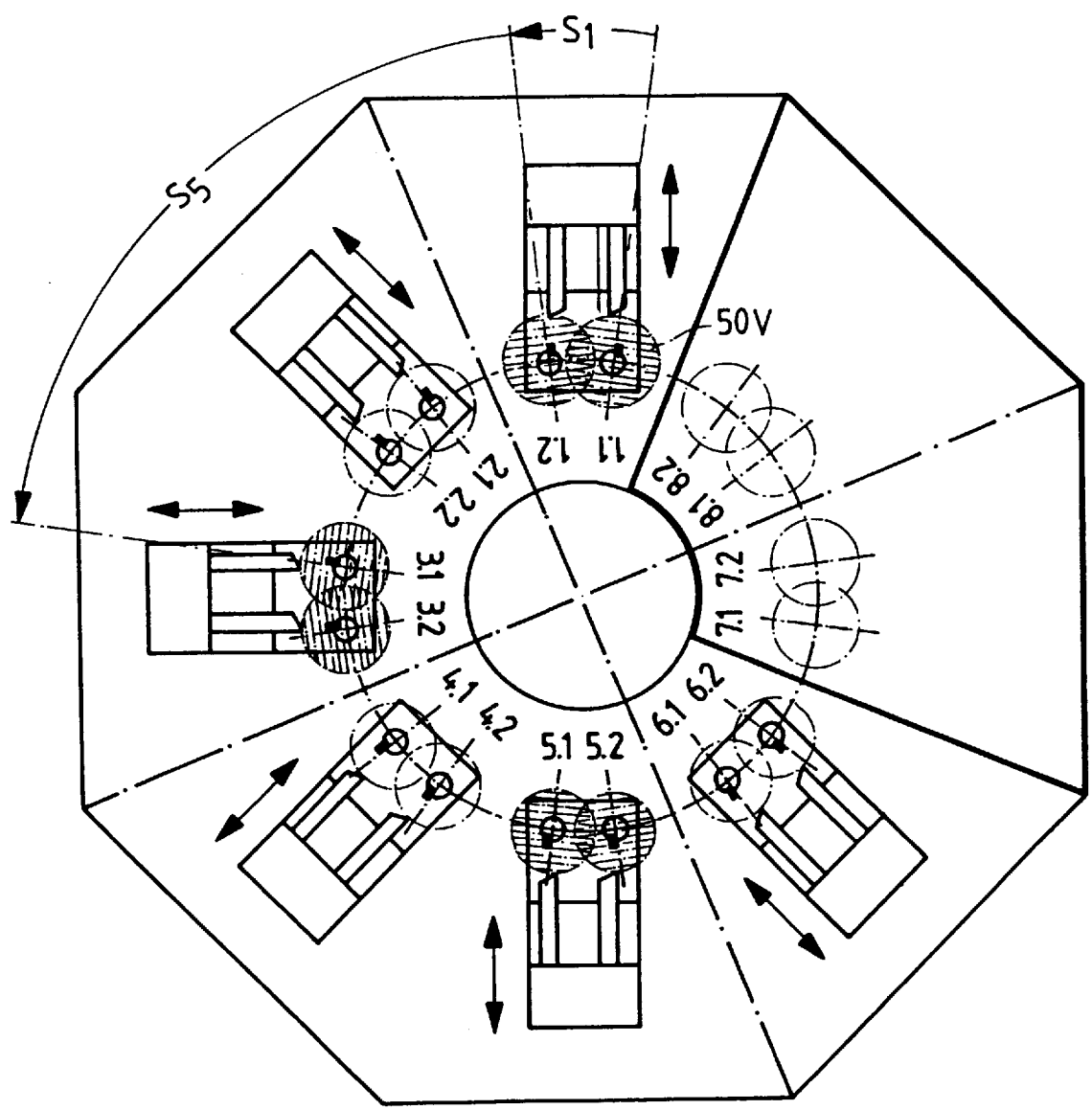
FIGS. 13 and 14 sections similar to FIG. 2 representing a seventh version of the process according to the invention.
Figure 14:
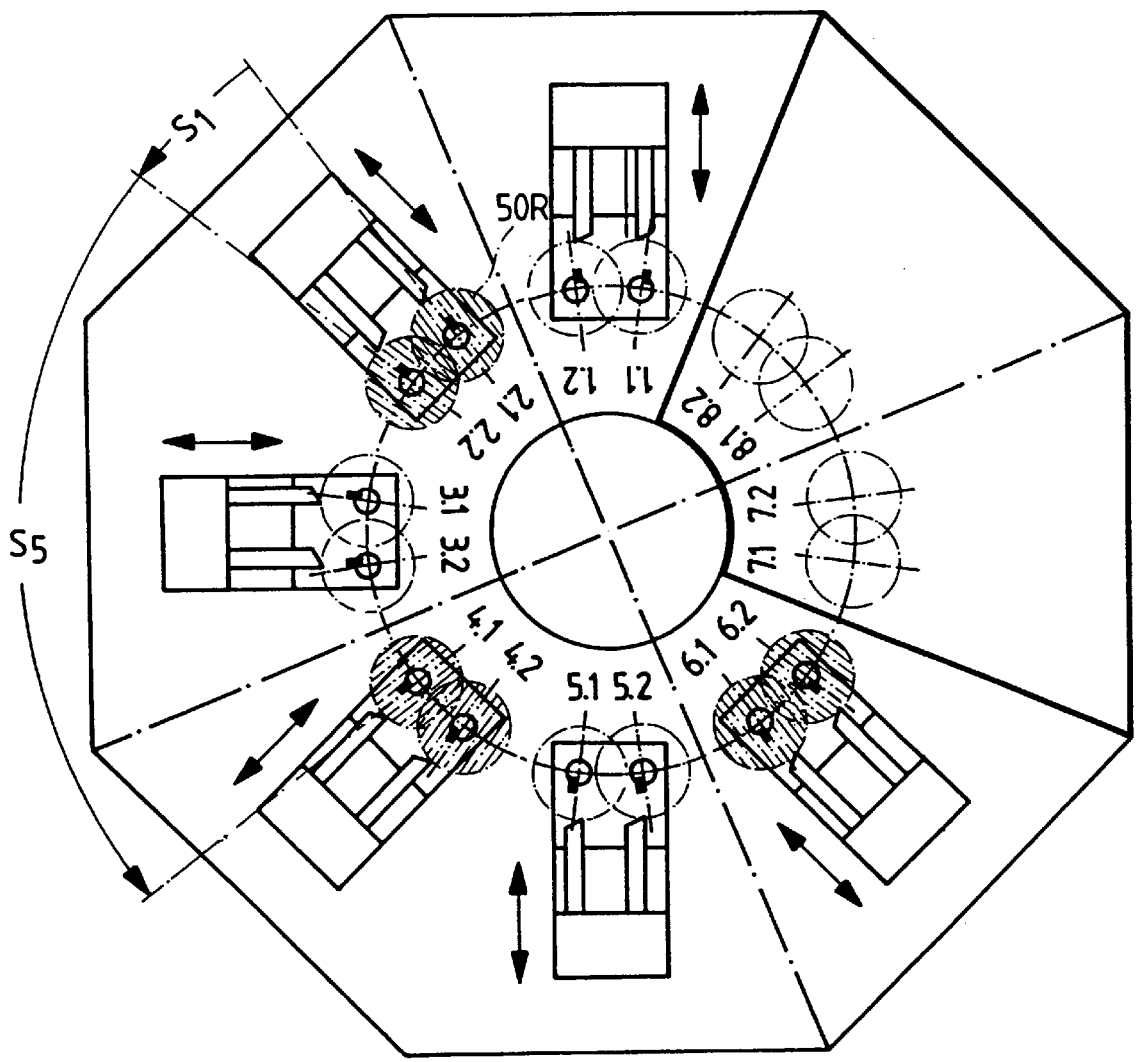

A seventh version of the process according to the invention also allows the front side machining and rear side machining to be completely divided over the individual spindle positions 1.1 to 6.2 of the machining stations 1 to 6, if, as shown in FIGS. 13 and 14, work piece 50V is moved through an angle step $S_1$ into the spindle position 1.2, starting from the spindle position 1.1, and then through an angle step $S_5$ into the spindle position 3.1, and then through a switching step $S_1$ into the spindle position 3.2, and so on. Overall, as a result of this, the work piece 50V only passes through the spindle positions 1.1 and 1.2, 3.1 and 3.2 as well as 5.1 and 5.2, i.e. all of machining stations 1, 3 and 5, but does not reach the spindle positions 2.1 and 2.2, 4.1 and 4.2 as well as 6.1 and 6.2 of machining stations 2, 4 and 6. Hence, the front side machining and rear side machining may be completely shared over machining stations 1, 3 and 5 using the respective first and second spindle positions thereof.

In contrast, using the same angle steps $S_1$ and $S_5$, the work piece 50R, starting in spindle position 2.1, only reaches the spindle position 2.2, 4.1 and 4.2 as well as 6.1 and 6.2, and not the spindle positions 1.1 and 1.2, 3.1 and 3.2, 5.1 and 5.2 of machining stations 1, 3 and 5, which are reached by work piece 50V.

Hence, with cyclically recurring application of angle steps $S_1$ and $S_5$, it is possible to share the front side machining and rear side machining over machining stations 2, 4 and 6 so that tools 52 and/or 54 being used in the individual spindle positions of these machining stations can be respectively adapted to the corresponding type of machining.

Since, in the case of the seventh version, only work pieces 50V arrive in a station for front side machining or only work pieces 50R for rear side machining, it is necessary to provide two stations 7 and 8 for changing the clamping of the work pieces 50, and also for loading and unloading rough work pieces 50 or those fully machined on two sides, so that, in contrast to the sixth version, there is no possibility of only using one station for this purpose, namely station 8, as Table 1 and FIG. 6 also show.

In the seventh version, the step sequence comprises the angle steps $S_1$ and $S_5$ and a total of four such step sequences forms a work piece cycle.

Figure 15:
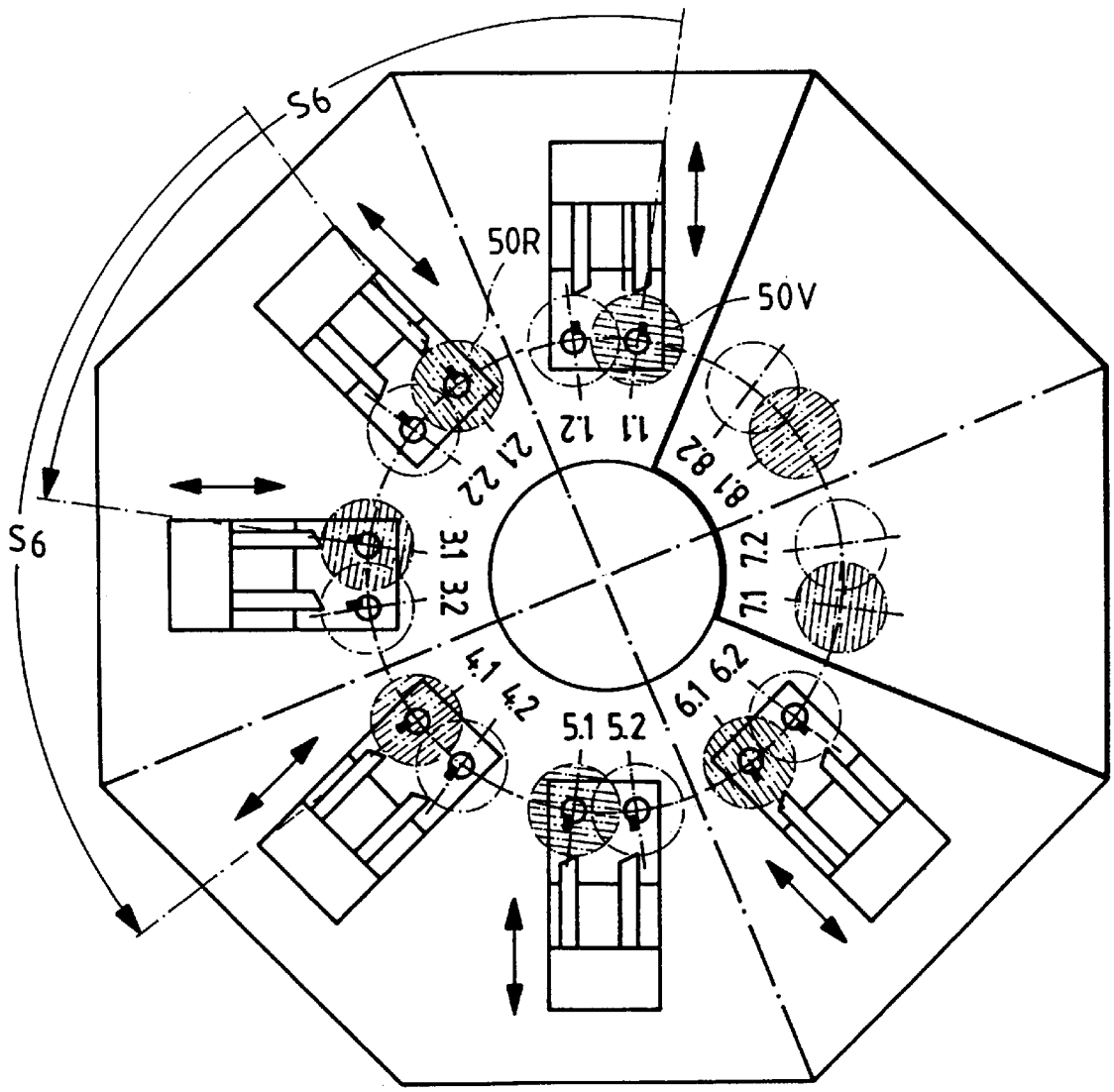
FIGS. 15 and 16 sections similar to FIG. 2 representing an eighth version of the process according to the invention.
Figure 16:
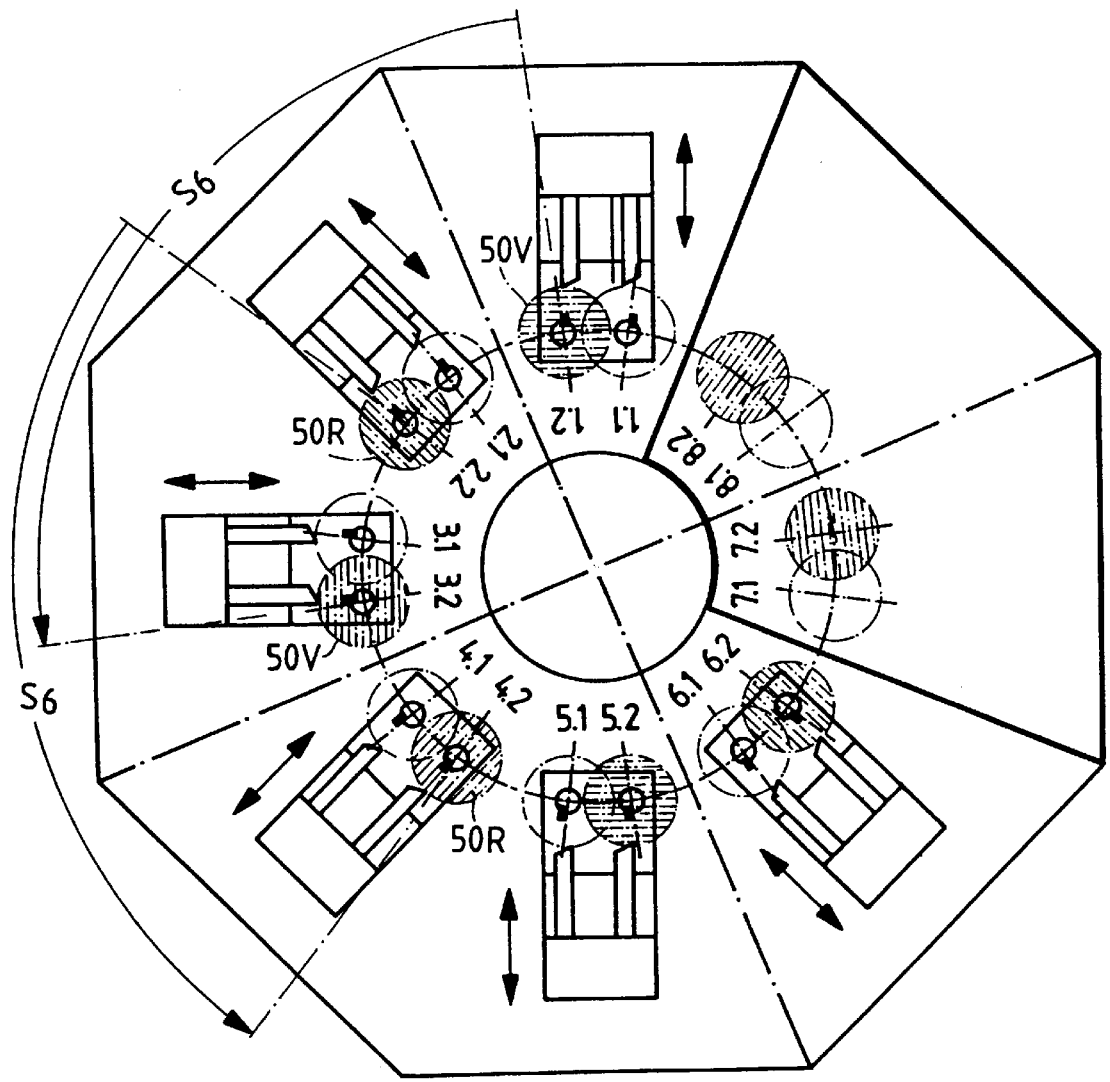

In an eighth version of the process according to the invention, shown in FIGS. 15 and 16, the spindle drum 14 is rotated around angle steps $S_6$ so that, when the work pieces 50V and 50R are arranged in the work piece spindles $40_1 \ldots 40_8$ in the manner described for the first time in conjunction with the third version, only work pieces 50V arrive, on the one hand, in the first spindle positions 1.1, 3.1, 5.1, 7.1 of the respective alternate stations 1, 3, 5 and 7 for front side machining, and on the other hand only work pieces 50R arrive for rear side machining in the first spindle positions 2.1, 4.1, 6.1, 8.1 from alternate stations 2, 4, 6 and 8 arranged displaced by one station, thus allowing a separation of spindle positions 1.1, 3.1 and 5.1, in which only tools 52 and/or 54 are available for front side machining, and spindle positions 2.1, 4.1, 6.1, in which only tools 52 and/or 54 are available for rear side machining.

If tools 52 and/or 54 are abraded or worn away in the first spindle positions 1.1 to 6.1 after a period of time $t_1$, then a change is made through an angle step $S_1$ from a machining operation of the work pieces 50V and 50R in the first spindle positions 1.1 to 6.1 to a machining operation of the work pieces 50V and 50R in the second spindle positions 1.2 to 6.2.

Since the work pieces 50V and 50R always stand in different stations in the case of the angle steps used in the eight versions, it is necessary to provide two stations, namely stations 7 and 8, for example, for the loading and unloading of rough work pieces 50 or work pieces 50 which have been machined on both sides.

The step sequence comprises only angle step $S_6$, so that four identical step sequences form a work piece cycle, in which case the number of tools which may be used also amounts to 6 for the eight versions, if only one of the tools 52 or 54 is used, as shown in Table 1 as well as FIG. 6.

I claim:

1. A multiple-spindle turning machine, comprising:

a machine frame, a spindle drum arranged to rotate relative to the machine frame around a drum axis, said spindle drum having a number of work piece spindles, which are arranged at defined angular distances ($\gamma$) relative to the drum axis and, during a rotation of the spindle drum, movable in a direction of rotation relative to the machine frame, said work piece spindles being respectively provided with a work piece receiving means for a work piece, and a number of operating stations, comprising at least one machining station, said operating stations being arranged consecutively on the machine frame in the direction of rotation of said spindle drum with said work piece spindles, wherein:

one or more of the at least one machining stations has a first and a second spindle position, which are arranged at an angular distance ($\alpha$) from one another relative to the drum axis;

the spindle drum is rotatable around said drum axis such that said work piece spindles with the corresponding work piece to be machined being held in said respective work piece receiving means are positionable in the first and second spindle positions; and each of the first and second spindle positions is provided with its own machining tool for machining the work pieces.

2. A multiple-spindle turning machine according to claim 1, wherein:

at least two of the operating stations are constructed as machining stations having respective first and second spindle positions.

3. A multiple-spindle turning machine according to claim 1, wherein:

said operating satations other than said at least one machining station having said first and second spindle positions, have at least one spindle position that is arranged at the angular distance ($\gamma$) from the first or the second spindle position of the machining station, and the angular distance ($\gamma$) for the spindle positions of each of the other ones of said operating stations corresponds to an integral multiple of 360° divided by the number of work piece spindles.

4. A multiple-spindle turning machine according to claim 1, wherein:

all the operating stations respectively have the same number of spindle positions.

5. A multiple-spindle turning machine according to claim 4, wherein:

the first spindle positions, arranged consecutively in the direction of rotation, of all stations are arranged at the angular distance ($\gamma$), which is 360° divided by the number of work piece spindles.

6. A multiple-spindle turning machine according to claim 4, wherein:

the second spindle positions, arranged consecutively in the direction of rotation, of all stations are arranged at the angular distance ($\gamma$), which is 360° divided by the number of work piece spindles.

7. A multiple-spindle turning machine according to claim 1, wherein:

the tools provided for the first and the second spindle positions of the machining station are movable on parallel tool paths.

8. A multiple-spindle turning machine according to claim 7, wherein:

the parallel tool paths run parallel to a direction radial to the drum axis located between the first and the second spindle position.

9. A multiple-spindle turning machine according to claim 1, wherein:

the machining tools provided for the first and second spindle positions of said machining station are movable in relation to the work piece spindle standing in this spindle position in an X-direction that is perpendicular to an axis of the work piece spindle.

10. A multiple-spindle turning machine according to claim 9, wherein:

in relation to a reference position of the work piece fixed with respect to the work piece spindle, the X-direction is arranged in the second spindle position displaced by an angle relative to the first spindle position, and a control means calculating the coordinates of a machining of the work piece takes into account the displacement.

11. A multiple-spindle turning machine according to claim 1, wherein:

the machining tools provided for the first and the second spindle positions of the machining station are positionable by a joint positioning device.

12. A multiple-spindle turning machine according to claim 11, wherein:

the machining tools provided for the first and the second spindle positions of the machining station are movable simultaneously by means of the joint positioning device.

13. A multiple-spindle turning machine according to claim 12, wherein:

the joint positioning device is a tool carriage, on which the machining tools provided for the first and the second spindle positions of the machining station are disposed.

14. A multiple-spindle turning machine according to claim 12, wherein:

the machining tools are immovably connected to the joint positioning device.

15. A multiple-spindle turning machine according to claim 11, wherein:

the joint positioning device is movable transversely to the drum axis.

16. A multiple-spindle turning machine according to claim 15, wherein:

the joint positioning device is movable in a direction radial to the drum axis.

17. A multiple-spindle turning machine according to claim 1, wherein:

two tools are provided for each spindle position.

18. A multiple-spindle turning machine according to claim 17, wherein:

the two tools provided for a spindle position are jointly movable.

19. A multiple-spindle turning machine according to claim 17, wherein:

the two tools provided for a spindle position are movable along a joint tool path.

20. A multiple-spindle turning machine according to claim 1, wherein:

the first and second spindle position of the machining station have an angular distance ($\alpha$) from one another, which does not equal the angular distance ($\beta$) of two directly consecutive spindle positions of two different directly consecutive operating stations.

21. A multiple-spindle turning machine according to claim 20, wherein:

the first and the second spindle position of the machining station have an angular distance ($\alpha$) from one another which is smaller than 360° divided by the number of spindle positions of all stations.

22. A multiple-spindle turning machine according to claim 20, wherein:

the first and the second spindle position have an angular distance ($\alpha$) from one another which corresponds to an integral fraction of the angular distance ($\beta$) between two directly consecutive spindle positions of two directly consecutive operating stations.

23. A multiple-spindle turning machine according to claim 1, wherein:

the angular distance ($\alpha$) between the first and the second spindle position is selected so that the work piece standing in one of the spindle positions is machined in a collision-free manner relative to the machining tool in the other spindle position.

24. A multiple-spindle turning machine according to claim 1, wherein:

the work piece spindles and the stations are arranged at constant angular distances ($\gamma$) from one another on the spindle drum.

25. A multiple-spindle turning machine according to claim 1, wherein:

the work piece spindles are movable in the direction of their spindle axis relatively to the spindle drum in order to achieve a z-axis movement for machining the work piece.

26. A multiple-spindle turning machine according to claim 1, wherein:

all the first spindle positions of all the machining stations, and all the second spindle positions of all the machining stations have their own set of machining tools.

27. A multiple-spindle turning machine according to claim 1, wherein:

work piece spindles arranged consecutively in the direction of rotation are alternately provided with a receiving means for a first side and a receiving means for a second side of the work piece.

28. A multiple-spindle turning machine according to claim 27, wherein:

all the spindle positions of all the machining stations have machining tools for both the first side and the second side of the work piece.

29. A multiple-spindle turning machine according to claim 27, wherein:

one of the first and second spindle positions of the machining station has a machining tool machining only one of the sides of the work piece.

30. A multiple-spindle turning machine according to claim 29, wherein:

a machining tool machining both sides of the work piece is arranged in the other spindle position of the machining station.

31. A multiple-spindle turning machine according to claim 29, wherein:

a machining tool only machining another side of the work piece is arranged in the other spindle position of the machining station.

32. A multiple-spindle turning machine according to claim 29, wherein:

at least two of the operating stations are constructed as machining stations having respective first and second spindle positions, machining tools only for the first side of the work piece are provided for both the first and second spindle positions of one of the machining stations, and machining tools only for the second side of the work piece are provided for the first and second spindle positions of another one of the machining stations.

33. A multiple-spindle turning machine according to claim 32, wherein:

said another one of the machining stations directly follows said one of the machining stations in the direction of rotation.

34. A multiple-spindle turning machine according to claim 1, wherein:

the number of operating stations corresponds at least to the number of work piece spindles.

35. A multiple-spindle turning machine according to claim 1, wherein:

the number of work pieces corresponds to the number of work piece spindles.

36. A process for the production of turned parts, comprising the steps of:

receiving work pieces as blanks in work piece receiving means of a number of work piece spindles, which are arranged on a spindle drum and upon rotation thereof are movable in a direction of rotation around a spindle drum axis, at least one of the work pieces being machined in at least one machining station, the at least one machining station being one of a number of operating stations arranged consecutively on the machine frame, carrying out a first machining operation in one of the at least one machining stations with a first tool in a first spindle position, and carrying out a second machining operation in one of the at least one machining stations with a second tool in a second spindle position, wherein the second spindle position is arranged at an angular distance relative to the first spindle position in said direction of rotation.

37. A process according to claim 36, wherein:

each of the operating stations is provided with first and second spindle positions that are arranged at equal angular distances from one another.

38. A process according to claim 37, wherein:

the work piece cycle is ended after passage through a specific number of operating stations.

39. A process according to claim 36, wherein:

a work piece is produced by means of a work piece cycle, which has at least one step sequence with at least one angle step for rotation of the spindle drum.

40. A process according to claim 39, wherein:

the work piece cycle comprises several identical step sequences.

41. A process according to claim 39, wherein:

each step sequence comprises several angle steps of different magnitude.

42. A process according to claim 37, wherein:

the sum of the angle steps of a step sequence amounts to an integral multiple of 360° divided by the number of work piece spindles.

43. A process according to claim 39, wherein:

when conducting the work piece cycles during a first period of time with the work piece spindles, only the first spindle positions are used, and thereafter only the second spindle positions are used during a second period of time.

44. A process according to claim 43, wherein:

the first period of time is determined by wear of the tools in the first spindle positions.

45. A process according to claim 43, wherein:

the second period of time is determined by wear of the tools in the second spindle positions.

46. A process according to claim 43, wherein:

after expiry of the first period of time, a rotation of the spindle drum occurs to change the position of the work piece spindles from the rotational positions of the first spindle positions to rotational positions of the second spindle positions.

47. A process according to claim 36, wherein:

the individual work piece spindles are passed one after the other through all the consecutive spindle positions in the direction of rotation.

48. A process according to claim 36, wherein:

the work pieces are machined on a first side and on a second side.

49. A process according to claim 48, wherein:

a next following spindle position in the direction of rotation is skipped with at least one of the angle steps of the step sequence.

50. A process according to claim 49, wherein:

only the next following spindle position in the direction of rotation is skipped with at least one of the angle steps of the step sequence.

51. A process according to claim 49, wherein:

the two next following spindle positions in the direction of rotation are skipped with the angle step.

52. A process according to claim 49, wherein:

the three next following spindle positions in the direction of rotation are skipped with the angle step.

53. A process according to claim 49, wherein:

each of the angle steps of a step sequence serves to skip a next following spindle position.

54. A process according to claim 49, wherein:

the individual work piece spindles are passed from one spindle position to the next following spindle position in the direction of rotation with one of the angle steps.

55. A process according to claim 36, wherein:

the number of operating stations corresponds at least to the number of work piece spindles.

56. A process according to claim 36, wherein:

the number of work pieces corresponds to the number of work piece spindles.

* * * * *